United States Patent [19]

Kayanuma

[11] Patent Number: 5,069,035
[45] Date of Patent: Dec. 3, 1991

[54] MISFIRE DETECTING SYSTEM IN DOUBLE AIR-FUEL RATIO SENSOR SYSTEM

[75] Inventor: Nobuaki Kayanuma, Gotenba, Japan

[73] Assignee: Toyota Jidosha Kabushiki Kaisha, Japan

[21] Appl. No.: 578,576

[22] Filed: Sep. 7, 1990

[30] Foreign Application Priority Data

Oct. 26, 1989 [JP] Japan .................................. 1-277226
Nov. 9, 1989 [JP] Japan .................................. 1-289993

[51] Int. Cl.⁵ ............................................. F01N 3/28
[52] U.S. Cl. ......................................... 60/274; 60/276; 60/277
[58] Field of Search .......................... 60/274, 276, 277

[56] References Cited

U.S. PATENT DOCUMENTS

| | | | |
|---|---|---|---|
| 4,006,718 | 2/1977 | Konomi | 60/276 |
| 4,445,326 | 5/1984 | Lyon | 60/277 |
| 4,693,076 | 9/1987 | Chujo et al. | |
| 4,703,619 | 11/1987 | Chujo et al. | |
| 4,723,408 | 2/1988 | Nagai et al. | |
| 4,747,265 | 5/1988 | Nagai et al. | |
| 4,819,427 | 4/1989 | Nagai et al. | |
| 4,831,838 | 5/1989 | Nagai et al. | |

FOREIGN PATENT DOCUMENTS

| | | | |
|---|---|---|---|
| 3339429 | 5/1985 | Fed. Rep. of Germany | 60/277 |
| 61-234241 | 10/1986 | Japan | |
| 62-29738 | 2/1987 | Japan | |
| 62-147034 | 7/1987 | Japan | |

Primary Examiner—Douglas Hart
Attorney, Agent, or Firm—Oliff & Berridge

[57] ABSTRACT

In a double air-fuel ratio sensor system having two air-fuel ratio sensors upstream and downstream of a catalyst converter, a main air-fuel ratio correction amount is calculated in accordance with the output of the upstream air-fuel ratio sensor, and a sub air-fuel ratio correction amount is calculated in accordance with the output of the downstream air-fuel ratio sensor, thereby adjusting an air-fuel ratio using the two air-fuel ratio correction amounts. When the sub air-fuel ratio correction reaches a lean limit value, an ignition system is determined to be abnormal and a misfire may occur.

40 Claims, 19 Drawing Sheets

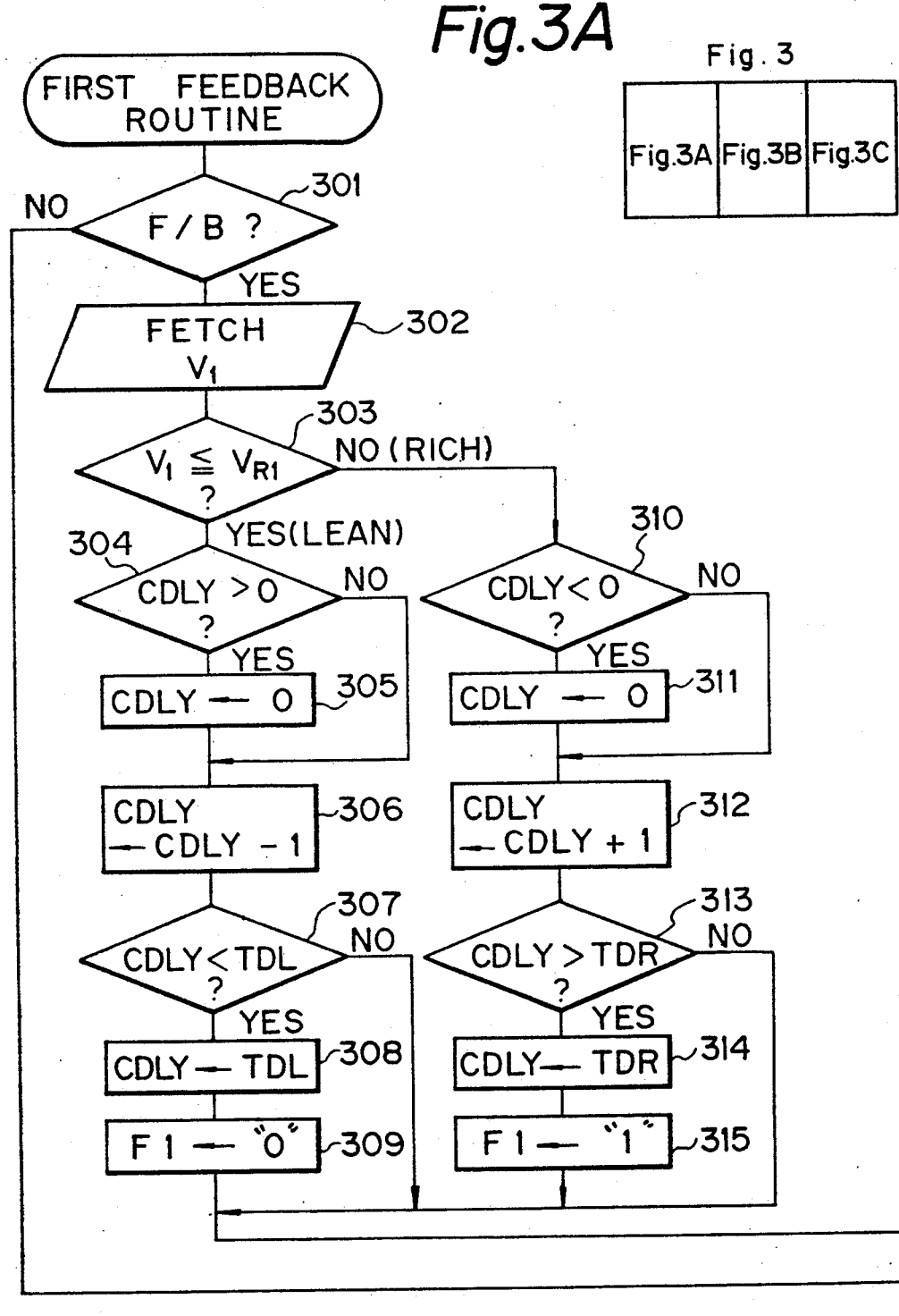

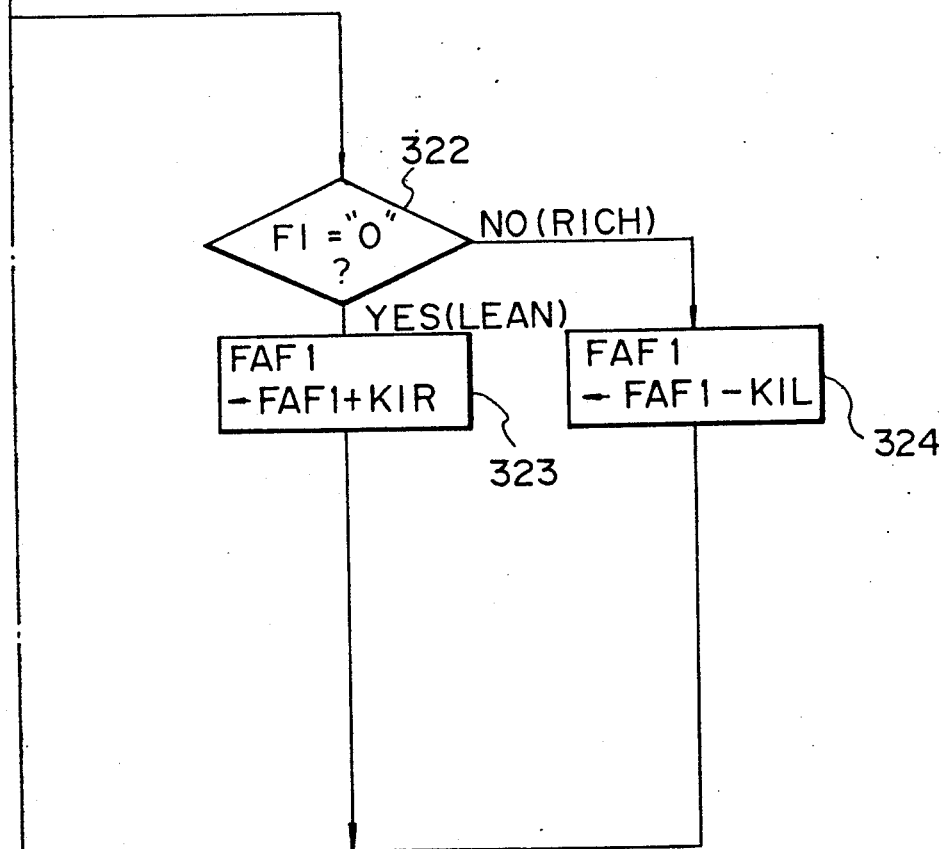

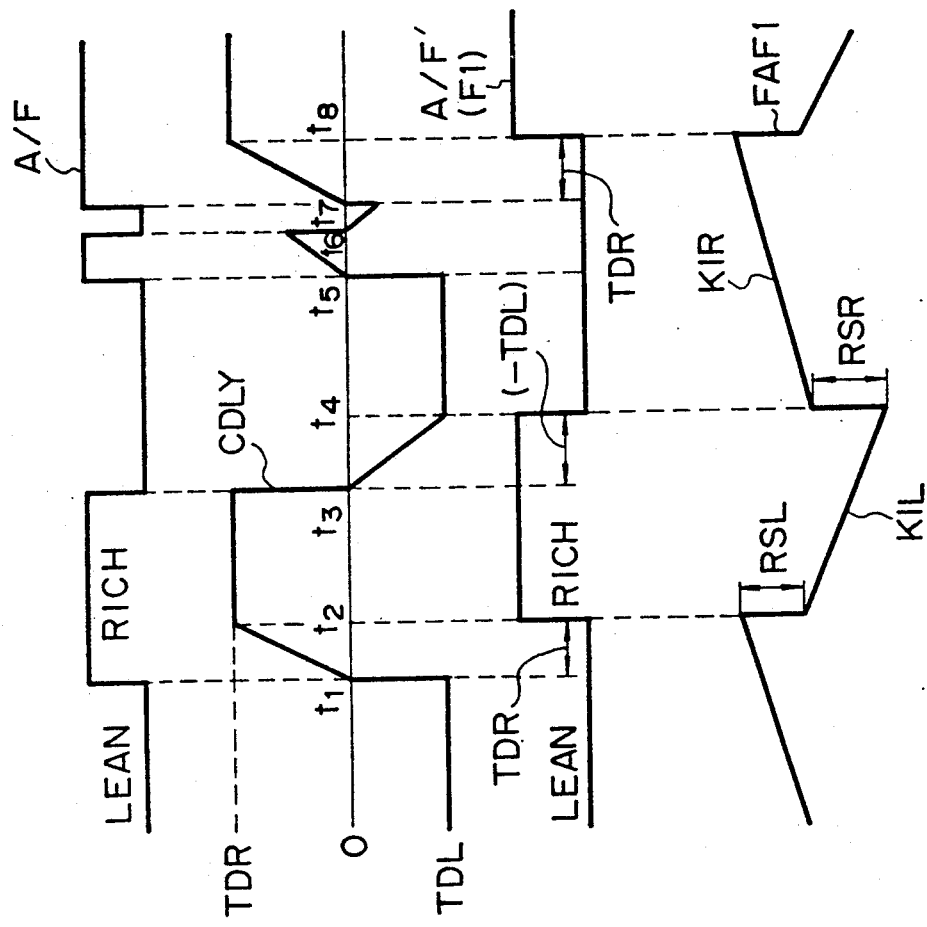

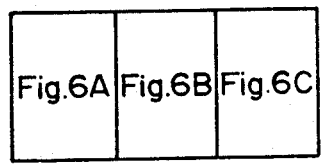
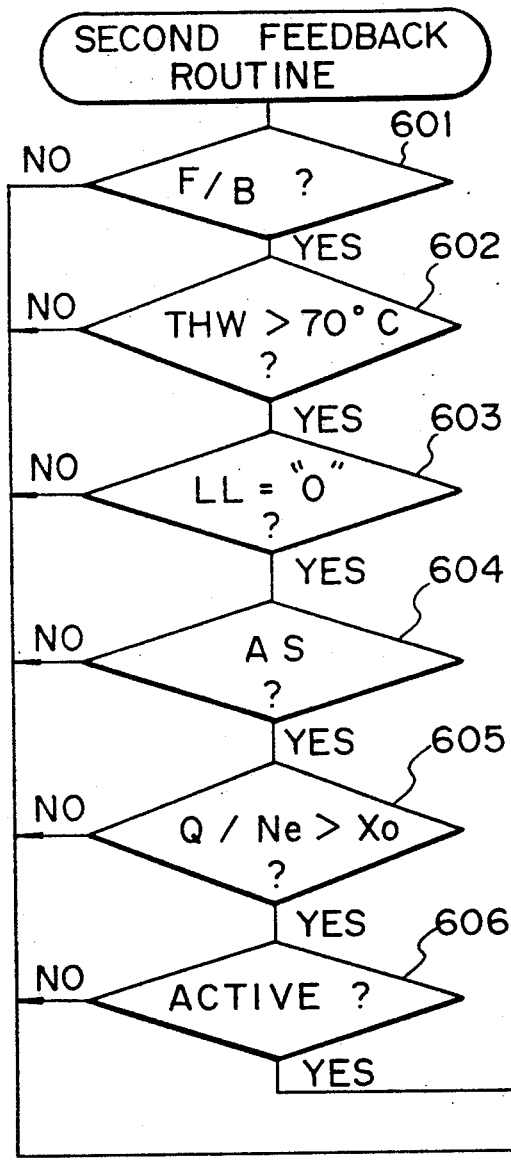
Fig.6A

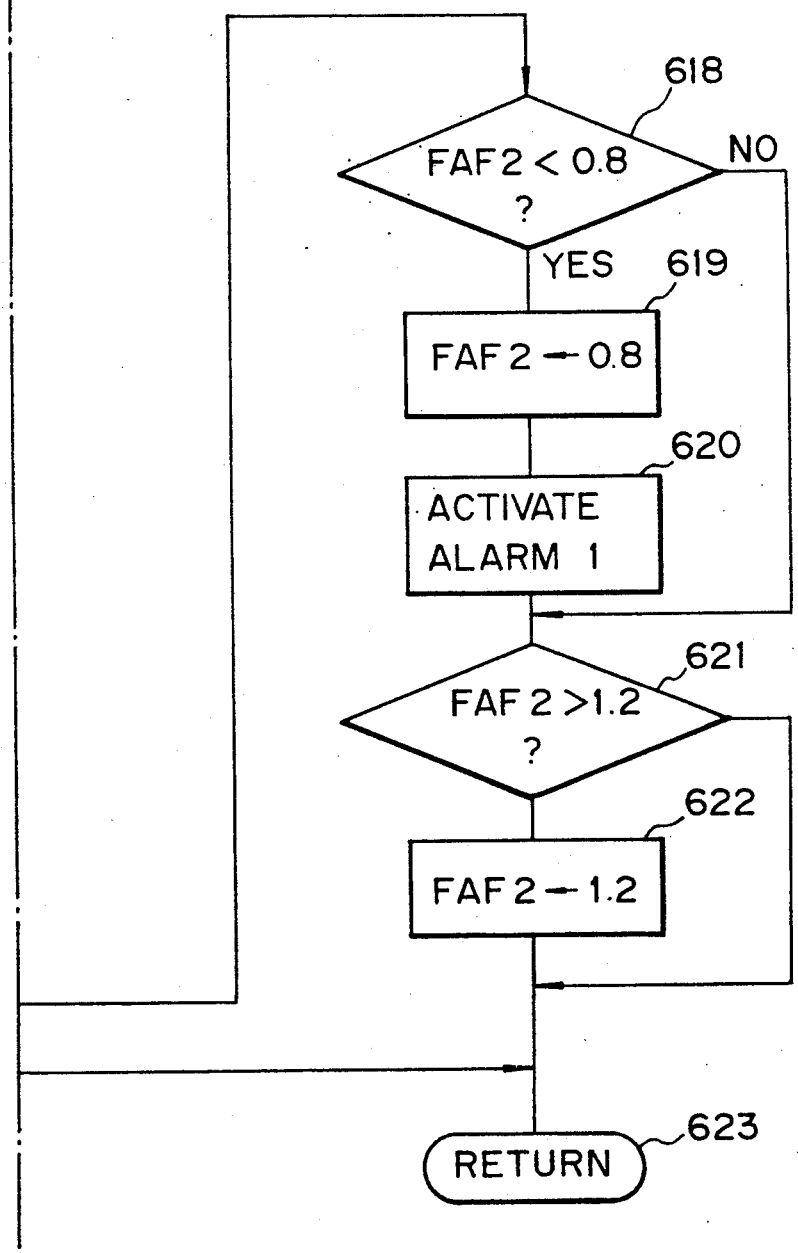

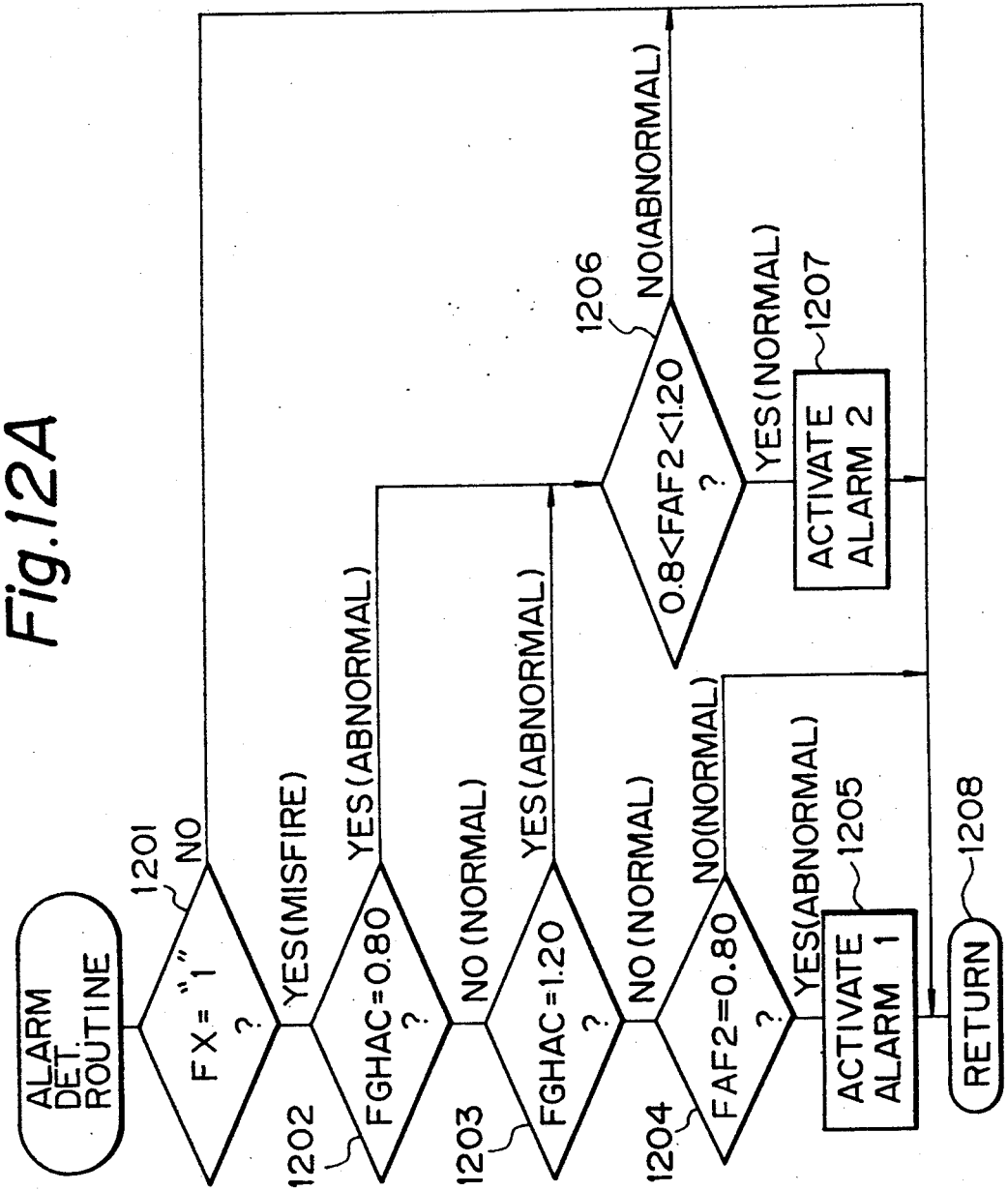

MISFIRE DETECTING SYSTEM IN DOUBLE AIR-FUEL RATIO SENSOR SYSTEM

BACKGROUND OF THE INVENTION

1. Field of the Invention

The present invention relates to a method and apparatus for detecting misfires, particularly, misfires due to an abnormality of an ignition system, in a double air-fuel ratio sensor system having air-fuel ratio sensors upstream and downstream of the catalysts in an exhaust gas passage.

2. Description of the Related Art

Generally, in a feedback control of the air-fuel ratio sensor ($O_2$ sensor) system, a base fuel amount TAUP is calculated in accordance with the detected intake air amount and detected engine speed, and the base fuel amount TAUP is corrected by an air-fuel ratio correction coefficient FAF which is calculated in accordance with the output of an air-fuel ratio sensor (for example, an $O_2$ sensor) for detecting the concentration of a specific component such as the oxygen component in the exhaust gas. Thus an actual fuel amount is controlled in accordance with the corrected fuel amount. The above-mentioned process is repeated so that the air-fuel ratio of the engine is brought close to a stoichiometric air-fuel ratio.

According to this feedback control, the center of the controlled air-fuel ratio can be within a very small range of air-fuel ratios around the stoichiometric ratio required for three-way reducing and oxidizing catalysts (catalyst converter) which can remove three pollutants CO, HC, and $NO_x$ simultaneously from the exhaust gas.

In the above-mentioned $O_2$ sensor system where the $O_2$ sensor is disposed at a location near the concentration portion of an exhaust manifold, i.e., upstream of the catalyst converter, the accuracy of the controlled air-fuel ratio is affected by individual differences in the characteristics of the parts of the engine, such as the $O_2$ sensor, the fuel injection valves, the exhaust gas recirculation (EGR) valve, the valve lifters, individual changes due to the aging of these parts, environmental changes, and the like. That is, if the characteristics of the $O_2$ sensor fluctuate, or if the uniformity of the exhaust gas fluctuates, the accuracy of the air-fuel ratio feedback correction amount FAF is also fluctuated, thereby causing fluctuations in the controlled air-fuel ratio.

To compensate for the fluctuation of the controlled air-fuel ratio, double $O_2$ sensor systems have been suggested (see: U.S. Pat. Nos. 4,747,265 and 4,819,427). In a double $O_2$ sensor system, another $O_2$ sensor is provided downstream of the catalyst converter, and thus an air-fuel ratio control operation is carried out by the downstream $O_2$ sensor in addition to an air-fuel ratio control operation carried out by the upstream $O_2$ sensor. In the double $O_2$ sensor system, although the downstream $O_2$ sensor has lower response speed characteristics when compared with the upstream $O_2$ sensor, the downstream-side $O_2$ sensor has an advantage in that the output fluctuation characteristics are small when compared with those of the upstream $O_2$ sensor, for the following reasons.

(1) On the downstream side of the catalyst converter, the temperature of the exhaust gas is low, so that the downstream $O_2$ sensor is not affected by a high temperature exhaust gas.

(2) On the downstream side of the catalyst converter, although various kinds of pollutants are trapped in the catalyst converter, these pollutants have little affect on the downstream $O_2$ sensor.

(3) On the downstream side of the catalyst converter, the exhaust gas is mixed so that the concentration of oxygen in the exhaust gas is approximately in an equilibrium state.

Therefore, according to the double $O_2$ sensor system, the fluctuation of the output of the upstreamside $O_2$ sensor is compensated by a feedback control using the output of the downstream $O_2$ sensor. Actually, as illustrated in FIG. 1, in the worst case, the deterioration of the output characteristics of the $O_2$ sensor in a single $O_2$ sensor system directly effects a deterioration in the emission characteristics. On the other hand, in a double $O_2$ sensor system, even when the output characteristics of the upstream-side $O_2$ sensor are deteriorated, the emission characteristics are not deteriorated. That is, in a double $O_2$ sensor system, even if only the output characteristics of the downstream $O_2$ are stable, good emission characteristics are still obtained.

In the above-mentioned double $O_2$ sensor system, however, no measure has been taken to detect an abnormal state in an ignition system, and as a result, when the ignition system is abnormal and misfiring occurs, drivers may often continue to drive the engine. Therefore, unburned gas is reacted with residual air (oxygen) within the catalyst converter, to this overheat and cause a deterioration of the catalyst converter.

Also in the double $O_2$ sensor system, even when a misfire is detected by detecting torque fluctuation using a firing pressure sensor, it is impossible to determine whether such a misfire originated from an ignition system or a fuel system, which is disadvantageous to the diagnosis.

SUMMARY OF THE INVENTION

An object of the present invention is to detect a misfire due to the abnormality of an ignition system in a double air-fuel ratio sensor system, to thus prevent a deterioration of the catalyst converter.

Another object of the invention is to discriminate a misfire due to the abnormality of an ignition system from a misfire due to an abnormality of a fuel system in a double air-fuel ratio sensor system.

According to the present invention, in a double air-fuel ratio sensor system having two air-fuel ratio sensors upstream and downstream of a catalyst converter, a main air-fuel ratio correction amount is calculated in accordance with the output of the upstream air-fuel ratio sensor, and a sub air-fuel ratio correction amount is calculated in accordance with the output of the downstream air-fuel ratio sensor, to thereby adjust an air-fuel ratio using the two air-fuel ratio correction amounts. When the sub air-fuel ratio correction reaches a lean limit value, an ignition system is determined to be abnormal and may cause misfiring.

That is, when a misfire due to the abnormality of the ignition system occurs, unburned gas and residual air are expelled from a misfiring cylinder even if the mean air-fuel ratio of all the cylinders is around the stoichiometric air-fuel ratio. Therefore, the upstream air-fuel ratio sensor is affected by the above-mentioned residual air to generate a lean output, and accordingly, the main air-fuel ratio correction amount is increased, so that the actual air-fuel ratio tends to be on the richer side. On the other hand, the downstream air-fuel ratio sensor is affected by the richer air-fuel ratio by the increased main air-fuel ratio correction amount, and accordingly, the downstream air-fuel ratio sensor generates a rich output, so that the sub air-fuel ratio correction amount is lowered, and when this misfiring state continues, the sub air-fuel ratio correction amount finally reaches a lean limit value.

Note that, when the characteristics of the upstream air-fuel ratio sensor are fluctuated, the overall air-fuel ratio is not as rich as when an abnormality of the ignition system occurs.

Also, according to the present invention, a misfire due to the abnormality of a fuel system is detected by determining whether or not the main air-fuel ratio correction amount has reached a rich limit value (or a lean limit value), thus discriminating the two kinds of misfires when a misfire occurs. That is, when a misfire due to the abnormality of a fuel system occurs, the output of the upstream air-fuel ratio sensor is greatly fluctuated, and accordingly, the main air-fuel ratio correction is greatly fluctuated. Therefore, in this case, the sub air-fuel ratio correction amount cannot remain at the lean limit value.

In more detail, when one fuel injection valve injects an excess fuel amount into the corresponding cylinder, a small amount of residual air is reacted with a large amount of unburned gas by the catalyst operation of the upstream air-fuel ratio sensor, and thus this sensor generates a rich output. As a result, the main air-fuel ratio correction amount (or a learning correction amount) is reduced. That is, the main air-fuel ratio correction amount (or the learning correction amount) remains at a lean limit value. Conversely, in this case, the air-fuel ratio downstream of the catalyst converter is already moved by the main air-fuel ratio correction amount (or the learning correction amount) to the lean side, but the sub air-fuel ratio correction amount is not changed.

On the other hand, when one fuel injection valve injects an insufficient fuel amount into the corresponding cylinder, a small amount of unburned gas is reacted with a large amount of residual air by the catalyst operation of the upstream air-fuel ratio sensor, so that this sensor generates a lean output. As a result, the main air-fuel ratio correction amount (or the learning correction amount) is increased. That is, the main air-fuel ratio correction amount (or the learning correction amount) remains at a rich limit value. Conversely, in this case, the air-fuel ratio downstream of the catalyst converter is already moved by the main air-fuel ratio correction amount (or the learning correction amount) to the rich side, but the sub air-fuel ratio correction amount is not changed.

BRIEF DESCRIPTION OF THE DRAWINGS

The present invention will be more clearly understood from the description as set forth below with reference to the accompanying drawings, wherein:

FIGS. 3A, 3B, 3C, 4, 6A, 6B, 6C, 7, 8, 9, 10, 12A, 12B, 13A, and 13B are flow charts showing the operation of the control circuit of FIG. 3;

FIGS. 5A through 5D are timing diagrams explaining the flow chart of FIG. 4.

DESCRIPTION OF THE PREFERRED EMBODIMENTS

Figure 1:
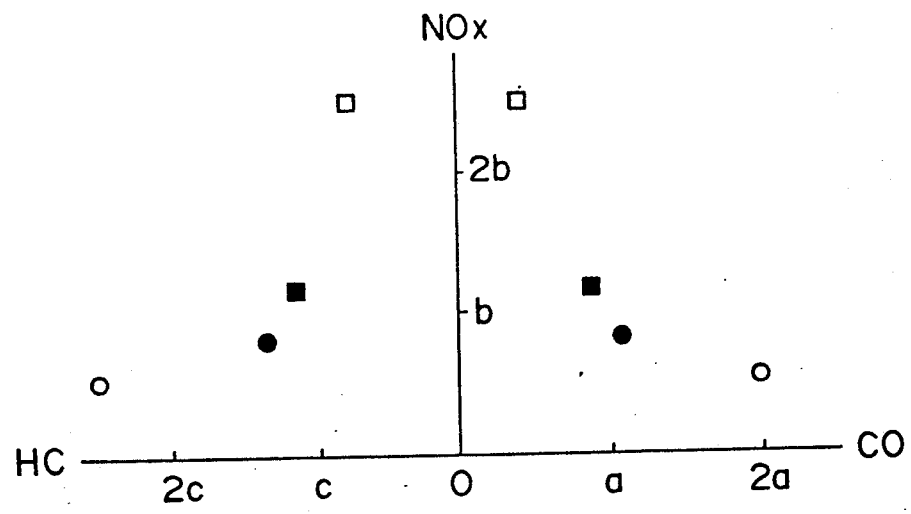
FIG. 1 is a graph showing the emission characteristics of a single $O_2$ sensor system and a double $O_2$ sensor system.
Figure 2:
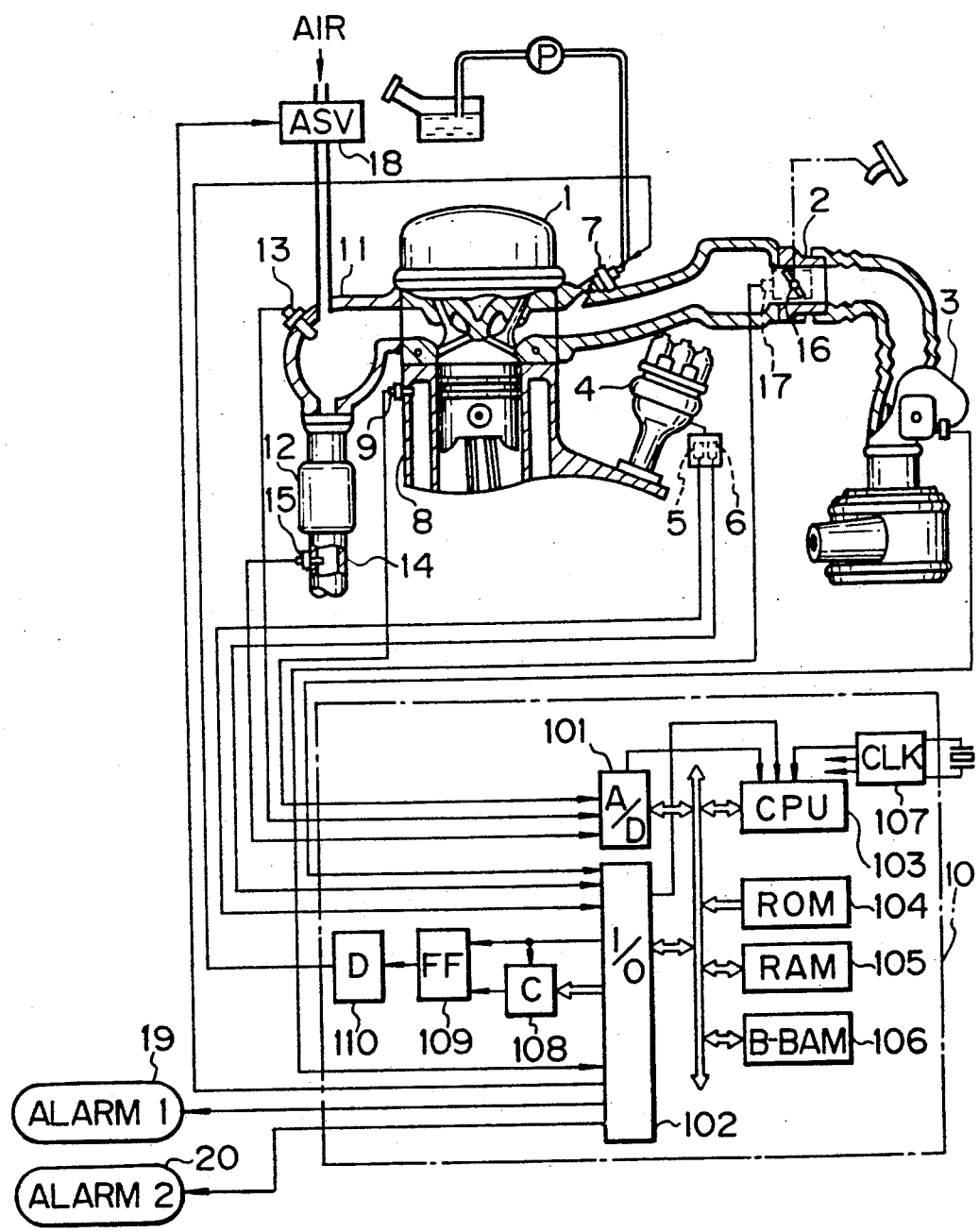
FIG. 2 is a schematic view of an internal combustion engine according to the present invention.

In FIG. 2, which illustrates an internal combustion engine according to the present invention, reference numeral 1 designates a four-cycle spark ignition engine disposed in an automotive vehicle. Provided in an air-intake passage 2 of the engine 1 is a potentiometer-type airflow meter 3 for detecting the amount of air drawn into the engine 1 to generate an analog voltage signal in proportion to the amount of air flowing therethrough. The signal of the airflow meter 3 is transmitted to a multiplexer-incorporating analog-to-digital (A/D) converter 101 of a control circuit 10. Also, the airflow meter 3 incorporates an intake air temperature sensor which generates an analog voltage signal in accordance with the temperature THA of the intake air. This signal is also supplied to the A/D converter 101 of the control circuit 10.

Disposed in a distributor 4 are crank angle sensors 5 and 6 for detecting the angle of the crank-shaft (not shown) of the engine 1.

In this case, the crank angle sensor 5 generates a pulse signal at every 720° crank angle (CA) and the crank-angle sensor 6 generates a pulse signal at every 30° CA. The pulse signals of the crank angle sensors 5 and 6 are supplied to an input/output (I/O) interface 102 of the control circuit 10. In addition, the pulse signal of the crank angle sensor 6 is then supplied to an interruption terminal of a central processing unit (CPU) 103.

Additionally provided in the air-intake passage 2 is a fuel injection valve 7 for supplying pressurized fuel from the fuel system to the air-intake port of the cylinder of the engine 1. In this case, other fuel injection valves are also provided for other cylinders, but are not shown in FIG. 3.

Disposed in a cylinder block 8 of the engine 1 is a coolant temperature sensor 9 for detecting the temperature of the coolant. The coolant temperature sensor 9 generates an analog voltage signal in response to the temperature THW of the coolant and transmits that signal to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided on the concentration portion of the exhaust manifold 11, i.e., upstream of the catalyst converter 12, is a first $O_2$ sensor 13 for detecting the concentration of oxygen composition in the exhaust gas. Further, provided in an exhaust pipe 14 downstream of the catalyst converter 12 is a second $O_2$ sensor 15 for detecting the concentration of oxygen composition in the exhaust gas. The $O_2$ sensors 13 and 15 generate output voltage signals and transmit those signals to the A/D converter 101 of the control circuit 10.

Reference 16 designates a throttle valve, and 17 designates an idle switch for detecting when the throttle valve 16 is fully closed. The output LL of the idle switch is supplied to the I/0 interface 102 of the control circuit 10.

Reference 18 designates an air suction valve of a secondary air supply system. When the engine is in a deceleration state or an idling state, the air suction valve 18 is opened to introduce secondary air into the exhaust manifold 11, thus reducing the HC and CO emissions.

Also, when the coolant temperature THW is low, the air suction valve 18 is closed to stop the introduction of secondary air into the exhaust manifold 11, thereby preventing overheating of the exhaust system. The air suction valve 18 is controlled, via a vacuum switch valve (not shown), by the control circuit 10 using the data of the engine speed $N_e$, the vehicle speed, the idle switch, the coolant temperature, and the like.

Reference 19 designates a misfire alarm which is activated when a misfire due to an abnormality of the ignition system is generated.

Reference 20 designates a misfire alarm which is activated when a misfire due to an abnormality of the fuel system is generated.

The control circuit 10, which may be constructed by a microcomputer, further comprises a central processing unit (CPU) 103, a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note that the battery (not shown) is connected directly to the backup RAM 106 and, therefore, the content thereof is not erased even when the ignition switch (not shown) is turned OFF.

The down counter 108, the flip-flop 109, and the driver circuit 110 are used for controlling the fuel injection valve 7. That is, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105. That is, the data Q and THW in the RAM 105 are renewed at predetermined intervals. The engine speed $N_e$ is calculated by an interrupt routine executed at 30° CA, i.e., at every pulse signal of the crank angle sensor 6, and is then stored in the RAM 105.

A first embodiment of the present invention will be explained with reference to FIGS. 3 through 9.

Figure 3B:
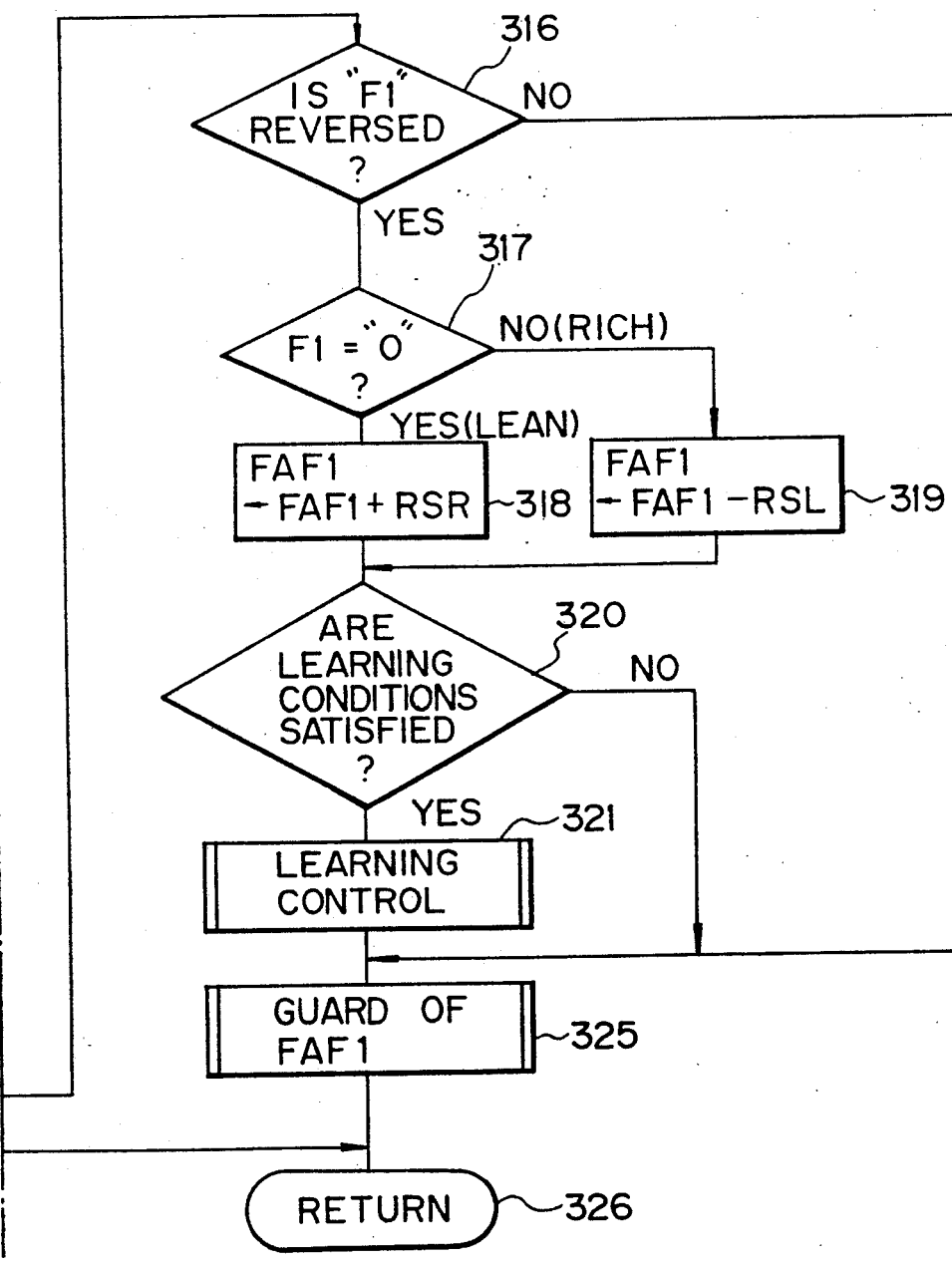

FIG. 3 is a routine for calculating a first air-fuel ratio feedback correction amount FAF1 in accordance with the output of the upstream O₂ sensor 13 executed at a predetermined time such as 4 ms.

At step 301, it is determined whether or not all of the feedback control (closed-loop control) conditions by the upstream O₂ sensor 13 are satisfied. The feedback control conditions are as follows.

i) the engine is not in a fuel cut-off state;
ii) the engine is not in a starting state;
iii) the coolant temperature THW is higher than 50° C.;
iv) the power fuel incremental amount FPOWER is 0; and
v) the upstream O₂ sensor 13 is in an activated state Note that the determination of activation/nonactivation of the upstream O₂ sensor 13 is carried out by determining whether or not the coolant temperature THW≧70° C., or by whether or not the output voltage $V_1$ of the upstream O₂ sensor 13 is lower than a predetermined value. Of course, other feedback control conditions are introduced as occasion demands, but an explanation of such other feedback control conditions is omitted.

If one or more of the feedback control conditions is not satisfied, the control proceeds to step 326, to thereby carry out an open-loop control operation. Note that, in this case, the amount FAF1 can be a value or a mean value immediately before the open-loop control operation. That is, the amount FAF1 or a mean value $\overline{FAF1}$ thereof is stored in the backup RAM 106, and in an open-loop control operation, the value RAF1 or $\overline{FAF1}$ is read out of the backup RAM 106. Note that the amount FAF1 can be 1.0.

Contrary to the above, at step 301, if all of the feedback control conditions are satisfied, the control proceeds to step 302.

At step 302, an A/D conversion is performed upon the output voltage $V_1$ of the upstream O₂ sensor 13, and the A/D converted value thereof is then fetched from the A/D converter 101. Then at step 303, the voltage $V_1$ is compared with a reference voltage $V_{R1}$ such as 0.45 V, thereby determining whether the current air-fuel ratio detected by the upstream O₂ sensor 13 is on the rich side or on the lean side with respect to the stoichiometric air-fuel ratio.

If $V_1 \leq V_{R1}$, which means that the current air-fuel ratio is lean, the control proceeds to step 304, which determines whether or not the value of a delay counter CDLY is positive. If CDLY>0, the control proceeds to step 305, which clears the delay counter CDLY, and then proceeds to step 306. If CDLY≦0, the control proceeds directly to step 306. At step 306, the delay counter CDLY is counted down by 1, and at step 307, it is determined whether or not CDLY<TDL. Note that TDL is a lean delay time period for which a rich state is maintained even after the output of the upstream O₂ sensor 13 is changed from the rich side to the lean side, and is defined by a negative value. Therefore, at step 307, only when CDLY<TDL does the control proceed to step 308, which causes CDLY to be TDL, and then to step 308, which causes a first air-fuel ratio flag F1 to be "0" (lean state). On the other hand, if $V_1 > V_{R1}$, which means that the current air-fuel ratio is rich, the control proceeds to step 310, which determines whether or not the value of the delay counter CDLY is negative. If CDLY>0, the control proceeds to step 311, which clears the delay counter CDLY, and then proceeds to step 312. If CDLY≧0, the control directly proceeds to 312. At step 312, the delay counter CDLY is counted up by 1, and at step 313, it is determined whether or not CDLY>TDR. Note that TDR is a rich delay time period for which a lean state is maintained even after the output of the upstream O₂ sensor 13 is changed from the lean side to the rich side, and is defined by a positive value. Therefore, at step 313, only when CDLY>TDR does the control proceed to step 314, which causes CDLY to be TDR, and then to step 315, which causes the first air-fuel ratio flag F1 to be "1" (rich state).

Next, at step 316, it is determined whether or not the first air-fuel ratio flag F1 is reversed, i.e., whether or not the delayed air-fuel ratio detected by the upstream $O_2$ sensor 13 is reversed. If the first air-fuel ratio flag F1 is reversed, the control proceeds to steps 317 to 319, which carry out a skip operation.

At step 317, if the flag F1 is "0" (lean), the control proceeds to step 318, which remarkably increases the correction amount FAF1 by a skip amount RSR. Also, if the flag F1 is "1" (rich) at step 317, the control proceeds to step 319, which remarkably decreases the correction amount FAF1 by a skip amount RSL.

Also, after every skip operation at step 318 or 319, the control proceeds to steps 320 and 321, which perform a learning operation upon the air-fuel ratio correction amount FAF1. That is, at step 320, it is determined whether or not all of the learning control conditions are satisfied. One of the learning control conditions is that the intake air amount Q is smaller than a predetermined value $Q_0$. If the learning control operation is carried out under the condition that $Q \geq Q_0$, a learning correction amount FGHAC is erroneously learned, i.e., an overcorrection due to the evaporation is made. Of course, other learning control conditions are also introduced as occasion demands. If one or more of the learning control conditions are not satisfied, the control proceeds to step 325, and if all the learning control conditions are satisfied, the control proceeds to step 321 which carries out a learning control operation, which will be explained later with reference to FIG. 4.

On the other hand, if the first air-fuel ratio flag F1 is not reversed at step 316, the control proceeds to steps 322 to 324, which carries out an integration operation. That is, if the flag F1 is "0" (lean) at step 322, the control proceeds to step 323, which gradually increases the correction amount FAF1 by a rich integration amount KIR. Also, if the flag F1 is "1" (rich) at step 322, the control proceeds to step 324 which gradually decreases the correction amount FAF1 by a lean integration amount KIL.

At step 325, the correction amount FAF1 is guarded by a minimum value 0.8, is guarded by a maximum value 1.2. Thus, the controlled air-fuel ratio is prevented from becoming overlean or overrich.

The correction amount FAF1 is then stored in the RAM 105, thus completing this routine of FIG. 3 at steps 326.

The learning control at step 321 of FIG. 3 is explained with reference to FIG. 4.

At step 401, a mean value FAFAV of the air-fuel ratio correction coefficient FAF is calculated by $$FAFAV \leftarrow (FAF1 + FAF1_0)/2$$

Where $FAF1_0$ is a value of the air-fuel ratio correction amount FAF1 fetched previously at a skip operation. That is, the mean value FAFAV is a mean value of two successive values of the air-fuel ratio correction amount FAF1 immediately after the skip operations. Note that the mean value FAFAV can be obtained by four or more successive maximum and minimum values of the air-fuel ratio correction amount FAF1.

At step 402, in order to prepare the next execution $$FAF1_0 \leftarrow FAF1$$

At step 403, a difference between the mean value FAFAV and a reference value, which, in this case, is 1.0 corresponding to the stoichiometric air-fuel ratio, is calculated by:

$$\Delta FAF \leftarrow FAFAV - 1.0$$

At step 404, it is determined whether or not the difference $\Delta FAF$ is larger than a definite value such as 0. As a result, if $\Delta FAF>0$, then the base air-fuel ratio before the execution of the next skip operation is too rich, so that, at step 405, the learning correction amount FGHAC is increased by $$FGHAC \leftarrow FGHAC + \Delta FGHAC$$

where $\Delta FGHAC$ is a definite value. Then, the learning correction amount FGHAC is guarded by a maximum value 1.05 at steps 406 and 407 and is stored in the backup RAM 106. Contrary to this, if $\Delta FAF \leq 0$, then the base air-fuel ratio before the execution of the next skip operation is too learn, so that, at step 408, the learning correction amount FGHAC is decreased by $$FGHAC \leftarrow FGHAC - \Delta FGHAC.$$

Then, the learning correction amount FGHAC is guarded by a minimum value 0.8 at steps 409 and 410, and is stored on the backup RAM 106.

Figure 4:
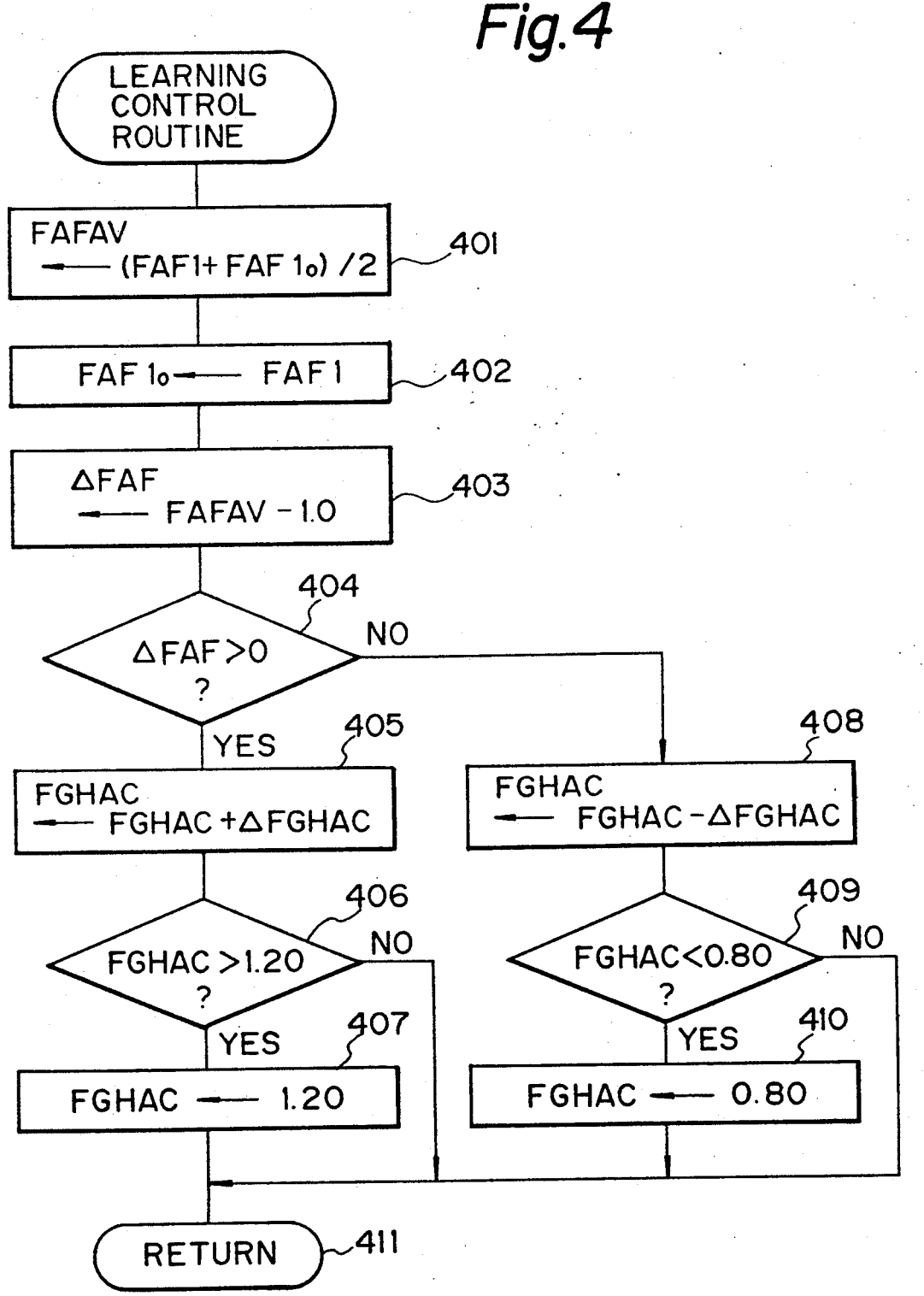

Thus, the routine of FIG. 4 is completed at step 411.

Note that, only if $|\Delta FAF|>K$ (positive value) is the learning correction amount FGHAC renewed.

According to the learning control, the learning correction amount FGHAC is increased or decreased so that the air-fuel ratio correction amount FAF1 is brought close to 1.0.

The operation by the flow chart of FIG. 3 will be further explained with reference to FIGS. 5A through 5D. As illustrated in FIG. 5A, when the air-fuel ratio A/F is obtained by the output $V_1$ of the upstream $O_2$ sensor 13, the delay counter CDLY is counted up during a rich state, and is counted down during a lean state, as illustrated in FIG. 5B. As a result, a delayed air-fuel ratio corresponding to the first air-fuel ratio flag F1 is obtained as illustrated in FIG. 5C. For example, at time $t_1$, even when the air-fuel ratio A/F is changed from the lean side to the rich side, the delayed air-fuel ratio A/F' (F1) is changed at time $t_2$ after the rich delay time period TDR. Similarly at time $t_3$, even when the air-fuel ratio A/F is changed from the rich side to the lean side, the delayed air-fuel ratio F1' is changed at time $t_4$ after the lean delay time period TDL. However, at time $t_5$, $t_6$, or $t_7$, when the air-fuel ratio A/F is reversed within a shorter time than the rich delay time TDR or the lean delay time TDL, the delay air-fuel ratio A/F' is reversed at time $t_8$. That is, the delayed air-fuel ratio A/F' is stable when compared with the air-fuel ratio A/F. Further, as illustrated in FIG. 5D, at every change of the delayed air-fuel ratio A/F, from the rich side to the lean side, or vice versa, the correction amount FAF1 is skipped by the skip amount RSR or RSL, and in addition, the correction amount FAF1 is gradually increased or decreased in accordance with the delayed air-fuel ratio A/F'.

Air-fuel ratio feedback control operations by the downstream $O_2$ sensor 15 will be explained. There are two types of air-fuel ratio feedback control operations by the downstream $O_2$ sensor 15, i.e., the operation type in which a second air-fuel ratio correction amount FAF2 is introduced thereinto by which an air-fuel ratio feedback control parameter in the air-fuel ratio feedback control operation by the upstream $O_2$ sensor 13 is variable. Further, as the air-fuel ratio feedback control parameter, there are nominated a delay time TD (in more detail, the rich delay time TDR and the lean delay time TDL), a skip amount RS (in more detail, the rich skip amount RSL, and the lean skip amount RSL), an integration amount KI (in more detail, the rich integration amount KIR and the lean integration amount KIL), on the reference voltage $V_{R1}$.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor Also, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the rich delay time TDR becomes longer or if the lean delay time TDL becomes shorter, the controlled air-fuel becomes rich, and if the lean delay time TDL becomes longer or if the rich delay time TDL becomes shorter, the controlled air-fuel ratio becomes leaner. Thus, the air-fuel ratio can be controlled by changing the rich delay time TDR and the lean delay time (-TDL) in accordance with the output of the downstream $O_2$ sensor 15. Still further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

There are various merits in the control of the air-fuel ratio feedback control parameters by the output $V_2$ of the downstream $O_2$ sensor 15. For example, when the delay times TDR are TDL and controlled by the output $V_2$ of the downstream $O_2$ sensor 15, it is possible to precisely control the air-fuel ratio. Also, when the skip amounts RSR and RSL are controlled by the output $V_2$ of the downstream $O_2$ sensor 15, it is possible to improve the response speed of the air-fuel ratio feedback control by the output $V_2$ of the downstream $O_2$ sensor 15. Of course, it is possible to simultaneously control two or more kinds of the air-fuel ratio feedback control parameters by the output $V_2$ of the downstream $O_2$ sensor 15.

A double $O_2$ sensor system into which a second air-fuel ratio correction amount FAF2 is introduced will be explained with reference to FIGS. 6 and 7.

Figure 6B:
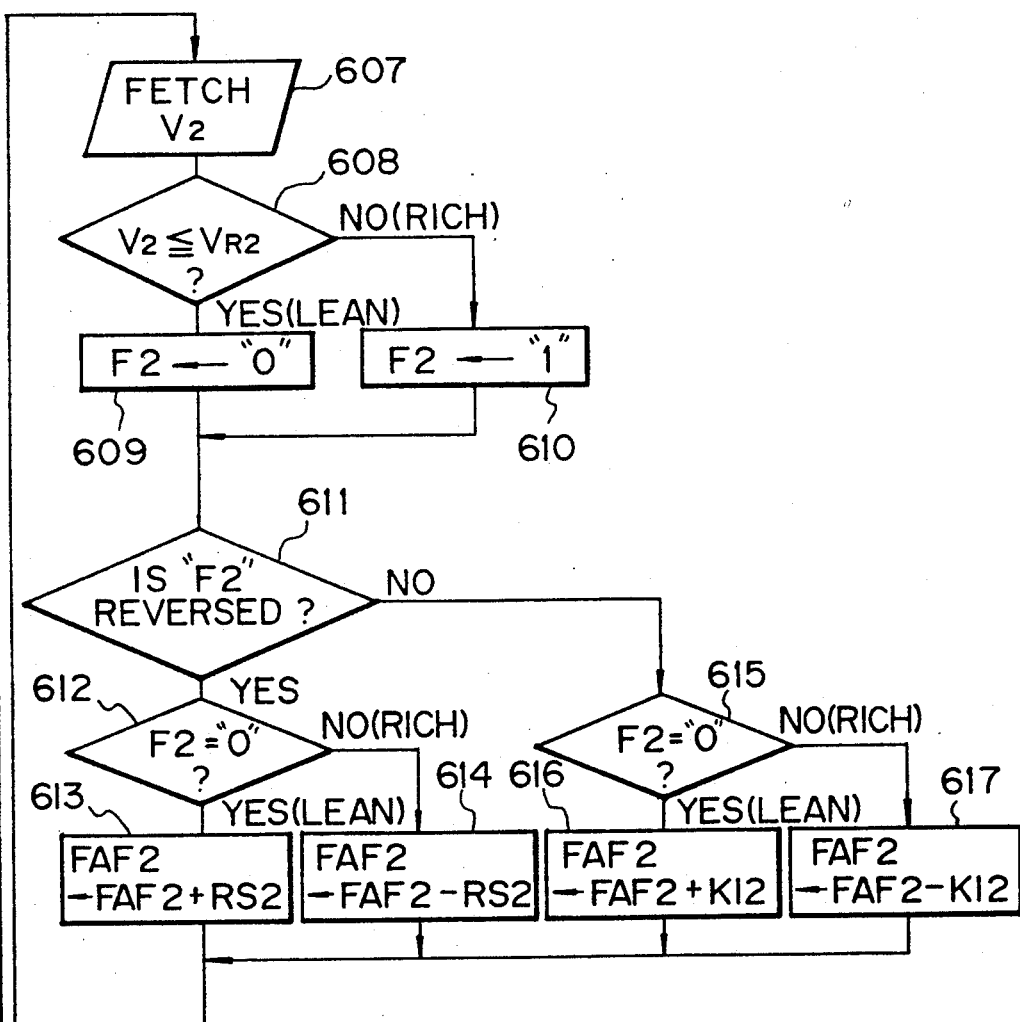

FIG. 6 is a routine for calculating a second air-fuel ratio feedback correction amount FAF2 in accordance with the output of the downstream $O_2$ sensor 15 executed at a predetermined time such as 1 s.

At steps 601 through 606, it is determined whether or not all of the feedback control (closed-loop control) conditions by the downstream $O_2$ sensor 15 are satisfied. For example, at step 601, it is determined whether or not the feedback control conditions by the upstream $O_2$ sensor 13 are satisfied. At step 602, it is determined whether or not the coolant temperature THW is higher than 70° C. At step 603, it is determined whether or not the throttle valve 16 is open (LL="0"). At step 604, it is determined whether or not the secondary air suction is carried out, i.e., the air suction valve 18 is opened in accordance with the engine speed $N_e$, the vehicle speed, the idle switch, the coolant temperature, and the like. At step 605, it is determined whether or not a load parameter such as $Q/N_e$ is larger than a predetermined value $X_0$. At step 606, it is determined whether or not the downstream $O_2$ sensor 15 is active. Note, the determination of an activation/nonactivation of the downstream air-fuel ratio sensor 15 is carried out on the same way as for the upstream $O_2$ sensor 13. Of course, other feedback control conditions are introduced as occasion demands.

If one or more of the feedback control conditions is not satisfied, the control directly proceeds to step 623, thereby carrying out an open-loop control operation. Note that, in this case, the amount FAF2 or a mean value $\overline{FAF2}$ thereof is stored in the backup RAM 106, and in an open-loop control operation, the value FAF2 or $\overline{FAF2}$ is read out of the backup RAM 106.

Contrary to the above, if all of the feedback control conditions are satisfied, the control proceeds to step 607.

At step 607, an A/D conversion is performed upon the output voltage $V_2$ of the downstream $O_2$ sensor 15 and the A/D converted value thereof is fetched from the A/D converter 101. At step 608, the voltage $V_2$ is compared with a reference voltage $V_{R2}$ such as 0.55 V, thereby determining whether the current air-fuel ratio detected by the downstream $O_2$ sensor 15 is on the rich side or on the lean side with respect to the stoichiometric air-fuel ratio. Note that the reference volta $V_{R2}$ (=0.55) is preferably higher than the reference voltage $V_{R1}$ (=0.45 V), in consideration of the different in output characteristics and deterioration speed between the $O_2$ sensor 13 upstream of the catalyst converter 12 and the $O_2$ sensor 15 downstream of the catalyst converter 12. However, the voltage $V_{R2}$ can be voluntarily determined.

At step 608, if the air-fuel ratio downstream of the catalyst converter 12 is lean, the control proceeds to step 609 which resets a second air-fuel ratio flag F2. Alternatively, the control proceeds to the step 610, which sets the second air-fuel ratio flag F2.

Next, at step 611, it is determined whether or not the second air-fuel ratio flag F2 is reversed. If the second air-fuel ratio flag F2 is reversed, the control proceeds to steps 612 to 614 which carry out a skip operation. That is, if the flag F2 is "0" (lean) at step 612, the control proceeds to step 613, which remarkably increases the second correction amount FAF2 by a skip amount RS2. Also, if the flag F2 is "1" (rich) at step 612, the control proceeds to step 614, which remarkably decreases the second correction amount FAF2 by the skip amount RS2. On the other hand, if the second air-fuel ratio flag F2 is not reversed at step 611, the control proceeds to steps 615 to 617, which carry out an integration operation. That is, if the flag F2 is "0" (lean) at step 615, the control proceeds to step 616, which gradually increases the second correction amount FAF2 by an integration amount KI2. Also, if the flag F2 is "1" (rich) at step 615, the control proceeds to step 617, which gradually decreases the second correction amount FAF2 by the integration amount KI2.

Note that the skip amount RS2 is larger than the integration amount KI2.

At steps 618 and 619, the second correction amount FAF2 is guarded by a minimum value 0.8. In this case, if the second air-fuel ratio correction amount FAF2 reaches the lean limit value 0.8, the control proceeds to step 620, which activates the misfire alarm 19 to notify the driver that a misfire due to the abnormality of the ignition system has been generated. This activation is stored in the backup RAM 106 for the diagnosis.

Then, at steps 621 and 622, the second air-fuel ratio correction amount FAF2 is guarded by a maximum value such as 1.2, thereby also preventing the controlled air-fuel ratio from becoming overrich or overlean.

The routine of FIG. 6 is then completed by step 623.

Figure 7:
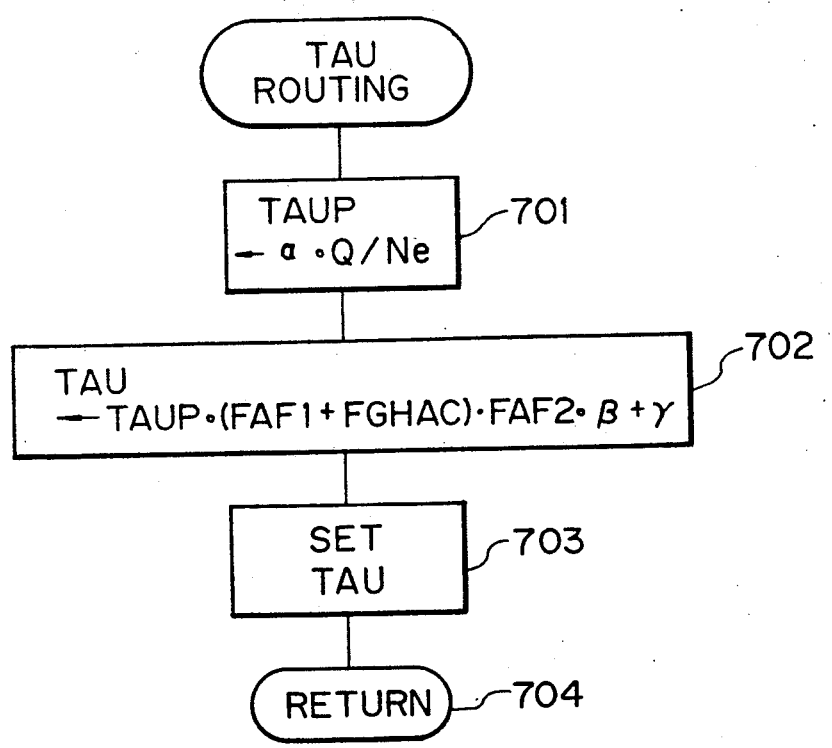

FIG. 7 is a routine for calculating a fuel injection amount TAU executed at every predetermined crank angle such as 360° CA. At step 701, a base fuel injection amount TAUP is calculated by using the intake air amount data Q and the engine speed data $N_e$ stored in the RAM 105. That is, TAUP←$\alpha \cdot Q/N_e$ where $\alpha$ is a constant. At step 702, a final fuel injection amount TAU is calculated by $$TAU \leftarrow TAUP \cdot (FAF1 + FGHAC) \cdot FAF2 \cdot \beta + \gamma$$

where $\beta$ and $\gamma$ are correction factors determined by other parameters such as the voltage of the battery and the temperature of the intake air. At step 703, the final fuel injection amount TAU is set in the down counter 107, and in addition, the flip-flop 108 is set to initiate the activation of the fuel injection valve 7. This routine is completed by step 704. Note that, as explained above, when a time corresponding to the amount TAU has passed, the flip-flop 109 is reset by the borrow-out signal of the down counter 108 to stop the activation of the fuel injection valve 7.

Thus, in FIGS. 3, 4, 6, and 7, when a misfire occurs due to the abnormality of the ignition system, the upstream $O_2$ sensor 13 responds to the residual air ($O_2$) of a misfiring cylinder to generate a lean signal. Therefore, the air-fuel ratio correction amount FAF1 is increased, but the increase of FAF1 is slight. Since this increase of FAF1 is absorbed by the learning correction amount FGHAC, the air-fuel ratio correction amount FAF1 is still 1.0. Even in this state, since the air-fuel ratio becomes richer, the downstream $O_2$ sensor 15 generates a rich signal to decrease the air-fuel ratio correction amount FAF2. Therefore, the air-fuel ratio correction amount FAF2 remains at the lean limit value 0.8.

A double $O_2$ sensor system, in which an air-fuel ratio feedback control parameter of the first air-fuel ratio feedback control by the upstream $O_2$ sensor 13 is variable, will be explained with reference to FIGS. 8 and 9. In this case, the skip amounts RSR and RSL as the air-fuel ratio feedback control parameters are variable.

Figure 8:
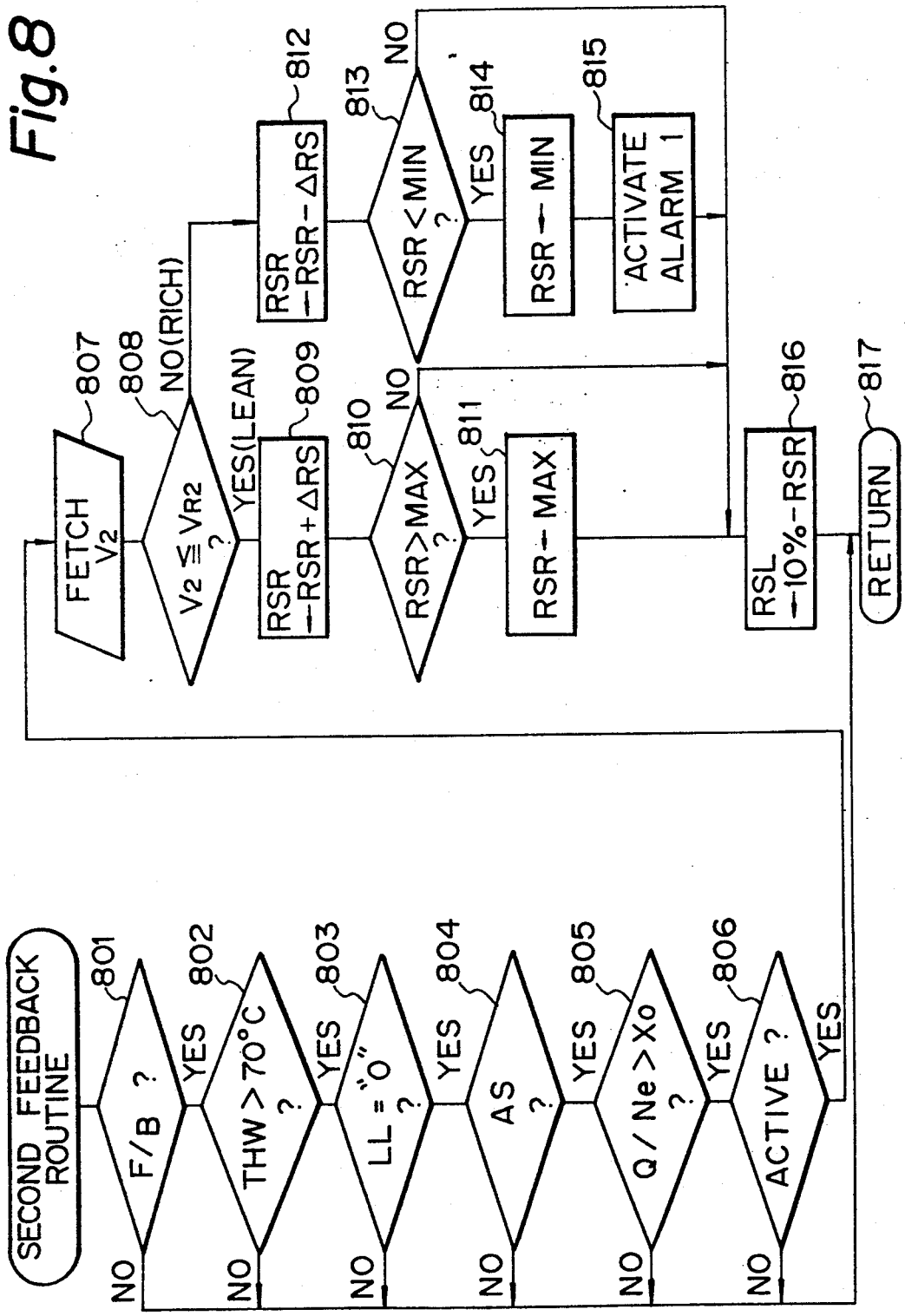

FIG. 8 is a routine for calculating the skip amounts RSR and RSL in accordance with the output $V_2$ of the downstream $O_2$ sensor 15 executed at a predetermined time such as 1 s.

Steps 801 through 806 are the same as steps 601 through 606 of FIG. 6. That is, if one or more of the feedback control conditions is not satisfied, the control proceeds directly to step 817, thereby carrying out an open-loop control operation. Note that, in this case, the skip amount RSR (RSL) or a mean value $\overline{RSR}$ $(\overline{RSL})$ thereof is stored in the backup RAM 106, and in an open-loop control operation, the value RSR (RSL) or $\overline{RSR}$ $(\overline{RSL})$ is read out of the backup RAM 106.

Contrary to the above, if all of the feedback control conditions are satisfied, the control proceeds to steps 807 through 812.

At step 807, an A/D conversion is performed upon the output voltage $V_2$ of the downstream $O_2$ sensor 15, and the A/D converted value thereof is fetched from the A/D converter 101. At step 808, the voltage $V_2$ is compared with the reference voltage $V_{R2}$, thereby determining whether the current air-fuel ratio detected by the downstream $O_2$ sensor 15 is on the rich side or on the lean side with respect to the stoichiometric air-fuel ratio. As a result, at step 808, if the air-fuel ratio downstream of the catalyst converter 12 is lean, the control proceeds to step 809. Alternatively, the control proceeds to the step 812.

At step 809, the rich skip amount RSR is increased by $\Delta RS$ to move the air-fuel ratio to the rich side. Then, at steps 810 and 811, the rich skip amount RSR is guarded by a maximum value MAX such as 7.5%. On the other hand, at step 812, the rich skip amount RSR is decreased by $\Delta RS$ to move the air-fuel ratio to the lean side. At steps 813 and 814, the rich skip amount RSR is guarded by a minimum value MIN such as 2.5%. In this case, if the rich skip amount RSR reaches the lean limit value MIN, the control proceeds to step 815, which activates the misfire alarm 19 to notify the driver that a misfire due to the abnormality of the ignition system has been generated. This activation is stored in the backup RAM 106 for the diagnosis.

Note that the minimum value MIN is a level by which the transient characteristics of the skip operation using the amounts RSR and RSL can be maintained, and the maximum value MAX is a level by which the drivability is not deteriorated by the fluctuation of the air-fuel ratio.

Then, at step 816, the lean skip amount RSL is calculated by $$RSL \leftarrow 10\% - RSR.$$

The routine of FIG. 8 is then completed by step 817.

Figure 9:
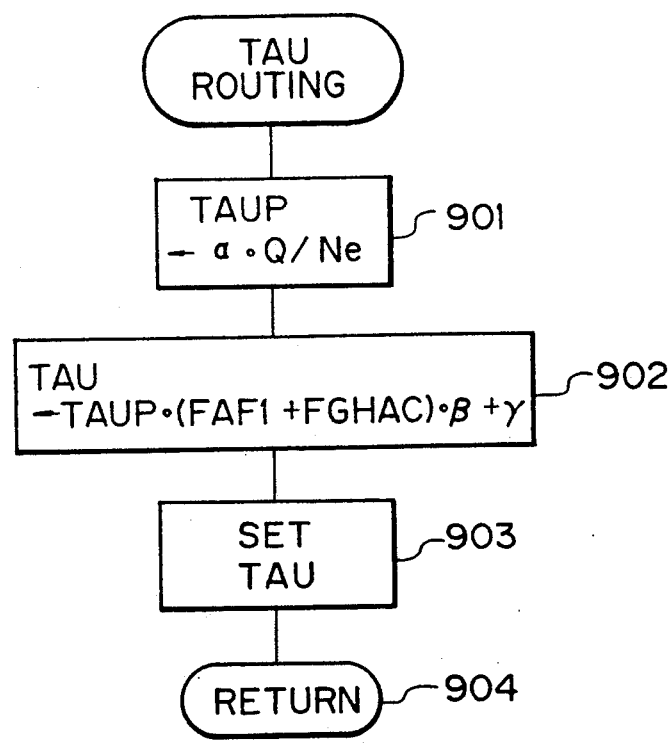

FIG. 9 is a routine for calculating a fuel injection amount TAU executed at every predetermined crank angle such as 360° CA.

Steps 901, 903 and 904 are the same as steps 701, 703, and 704, respectively, of FIG. 7.

At step 906, a final fuel injection amount TAU is calculated by $$TAU \leftarrow TAUP \cdot (FAF1 + FGHAC) \cdot \beta + \gamma$$

Thus, also in FIGS. 3, 4, 8, and 9 when a misfire occurs due to the abnormality of the ignition system, the upstream $O_2$ sensor 13 responds to the residual air ($O_2$) of a misfiring cylinder to generate a lean signal. Therefore, the air-fuel ratio correction amount FAF1 is increased, but the increase of FAF1 is slight. Since this increase of FAF1 is absorbed by the learning correction amount FGHAC, the air-fuel ratio correction amount FAF1 is still 1.0. Even in this state, since the air-fuel ratio becomes richer, the downstream $O_2$ sensor 15 generates a rich signal to decrease the rich skip amount RSR. Therefore, the rich skip amount RSR remains at the lean limit value 2.5%.

A second embodiment of the present invention will be explained with reference to FIGS. 10 through 13B. Note that FIGS. 3 through 9 are also applied to the second embodiment except that step 620 of FIG. 6 and step 815 are deleted.

Figure 10:
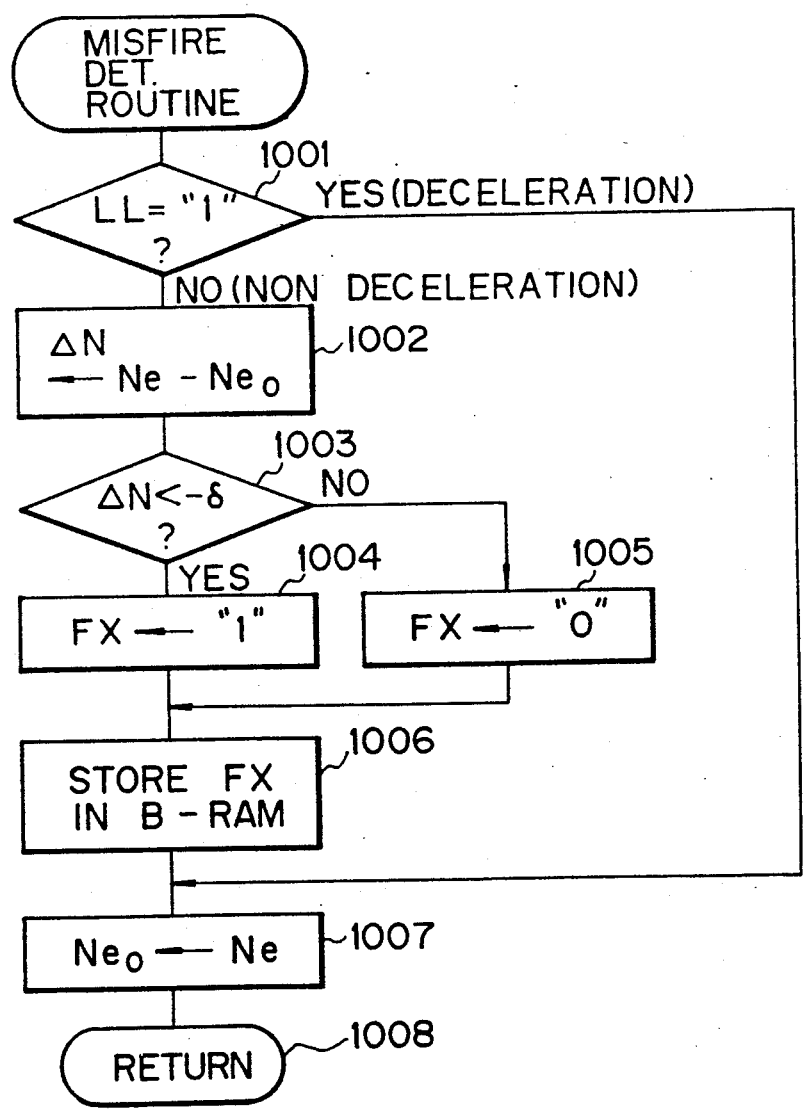

FIG. 10 is a routine for determining whether or not a misfire occurs, and is executed at a predetermined crank angle such as 180° CA. Note that this routine detects all kinds of misfires including a misfire due to the abnormality of the ignition system, a misfire due to the abnormality of the fuel system, and the like.

At step 1001, it is determined whether or not the engine is in a deceleration state, i.e., the idle switch is turned ON (LL="1"). Note that such a deceleration state can be detected by other driving parameters such as the intake air amount Q, the brake switch (not shown), or the like. Only if not in a deceleration state does the control proceeds to steps 1002 through 1006.

That is, at step 1002, the engine speed $N_e$ is read out of the RAM 105, and a reduction $\Delta N$ in the speed $N_e$ is calculated by $$\Delta N \leftarrow N_e - N_{e0}$$

where $N_{e0}$ is a previous value of the speed $N_e$. Then, at step 1003, it is determined whether or not $\Delta N$ is smaller than a definite value $-\delta$ ($\delta$ is a positive value such as 50 rpm). As a result, if $\Delta N < -\delta$, the control proceeds to step 1004 which sets a misfire flag FX (FX="1"), but if $\Delta N \geq -\delta$, the control proceeds to step 1005 which resets the misfire flag FX (FX="0"). At step 1006, the misfire FX is stored in the backup RAM 106 for the diagnosis.

At step 1007, the value $N_{e0}$ is replaced by $N_e$, to prepare for the next operation.

Thus, this routine of FIG. 10 is completed by step 1008.

Figure 11:
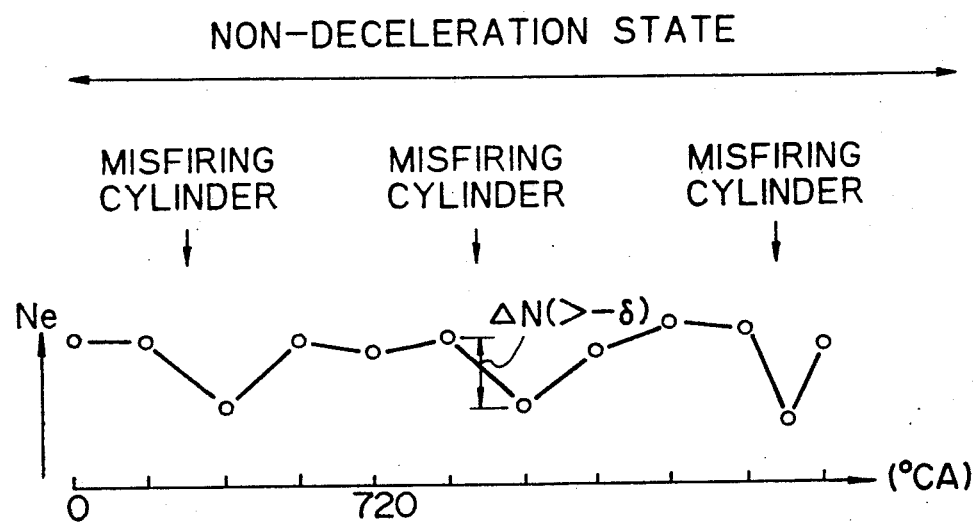
FIG. 11 is timing diagram explaining the flow chart of FIG. 10.

According to the routine of FIG. 10, as shown in FIG. 11, the reduction $\Delta N$ is determined only in a deceleration state, in other words, the reduction $\Delta N$ is not determined in a deceleration state, thus avoiding an erroneous determination.

Note that such a misfire can be detected by using the torque fluctuation in a non-deceleration state.

Figure 12B:
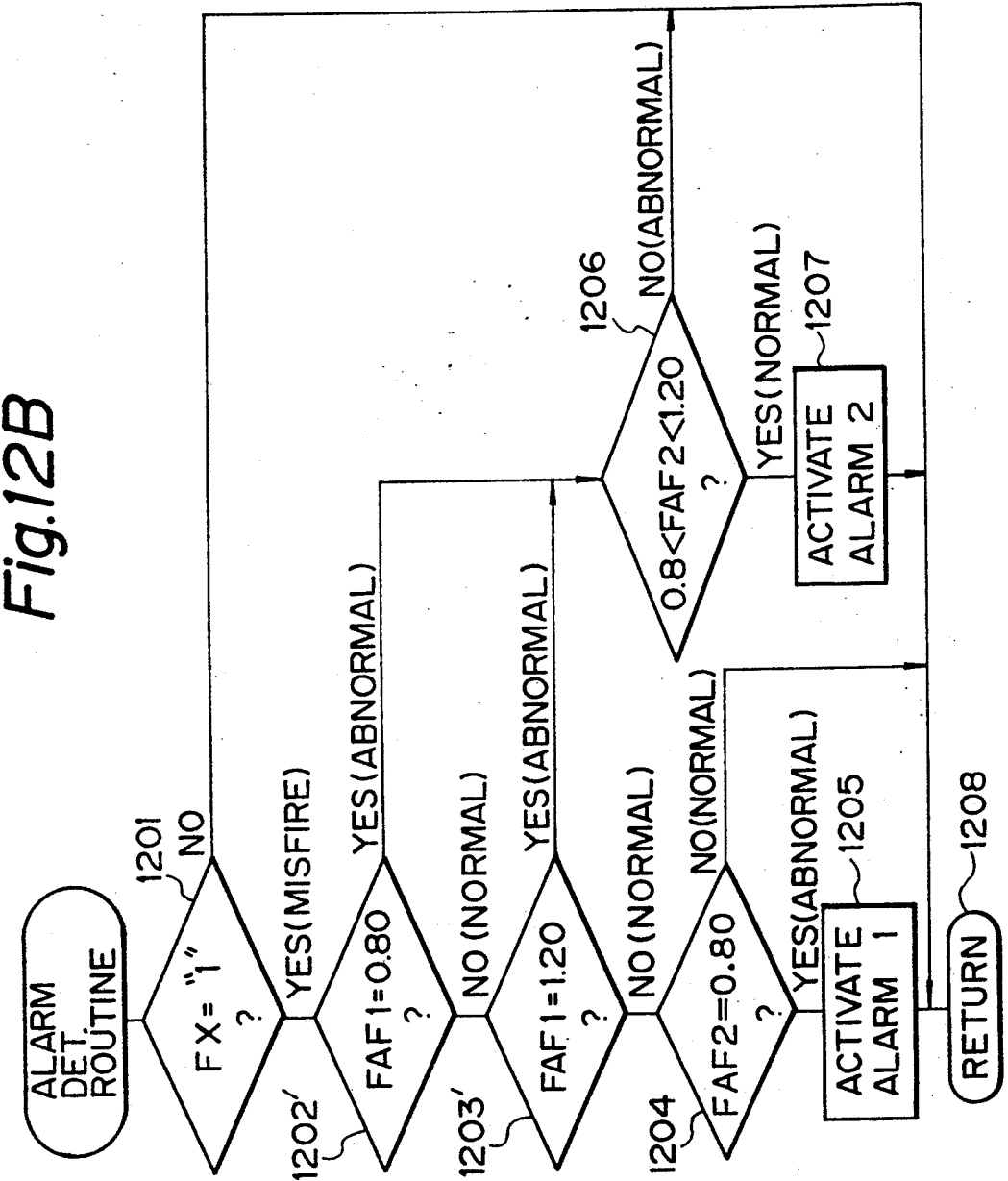

The case of FIGS. 6 and 7 wherein the second air-fuel ratio correction amount FAF2 is introduced is applied to FIGS. 12A and 12B.

FIG. 12A is a routine for determining whether the misfire originated from the ignition system or the fuel system, and is executed at predetermined intervals of, for example, 512 ms. At step 1201, it is determined whether or not a misfiring state has been established (FX="1"). As a result, only in a misfiring state does the control proceed to steps 1202 through 1207, which determine the origin of the misfire. Otherwise, the control proceeds directly to step 1208.

At step 1202 and 1203, it is determined whether the learning correction amount FGHAC is normal or abnormal. Note that the normal state of the amount FGHAC is defined by $$0.80 < FGHAC < 1.20,$$

and the abnormal state of the amount FGHAC is defined by

FGHAC=0.80 or FGHAC=1.20.

As a result, if the amount FGHAC is normal, the control proceeds to steps 1204 and 1205, which determine whether the misfire originated from the ignition system. Conversely, if the FGHAC is abnormal, the control proceeds to steps 1206 and 1207, which determine whether or not the misfire originated from the fuel system.

At step 1204, it is determined whether or not the second air-fuel ratio correction amount FAF2 has reached the lean limit value 0.80, and as a result, only if FAF2=0.8 does the control proceed to step 1205, which activates the misfiring alarm 19 to notify the driver that the misfire originated from the ignition system.

On the other hand, at step 1206, it is determined whether or not the second air-fuel ratio correction amount FAF2 is normal, i.e., $$0.80 < FAF2 < 1.20.$$

As a result, only if $0.80 < FAF2 < 1.20$ does the control proceed to step 1207, which activates the misfiring alarm 20 to notify the driver that the misfire originated from the fuel system.

Note that above-mentioned activation for the alarm 19 or 20 is stored in the backup RAM 106 for the diagnosis.

Then, this routine of FIG. 12A is completed by step 1208.

Also, when the learning control for the air-fuel ratio correction amount FAF1 is not carried out, the fluctuation of the air-fuel ratio correction amount FAF1 is not absorbed in the learning correction amount FGHAC. In this case, a routine of FIG. 12B, which is a modification of FIG. 12A, is used. In FIG. 12B, steps 1202' and 1203' are provided instead of steps 1202 and 1203 of FIG. 12A. At step 1202', it is determined whether or not the air-fuel ratio correction amount FAF1 has reached the lean limit value 0.80. Also, at step 1203', it is determined whether or not the air-fuel ratio correction amount FAF1 has reached the rich limit value 1.20.

Figure 13A:
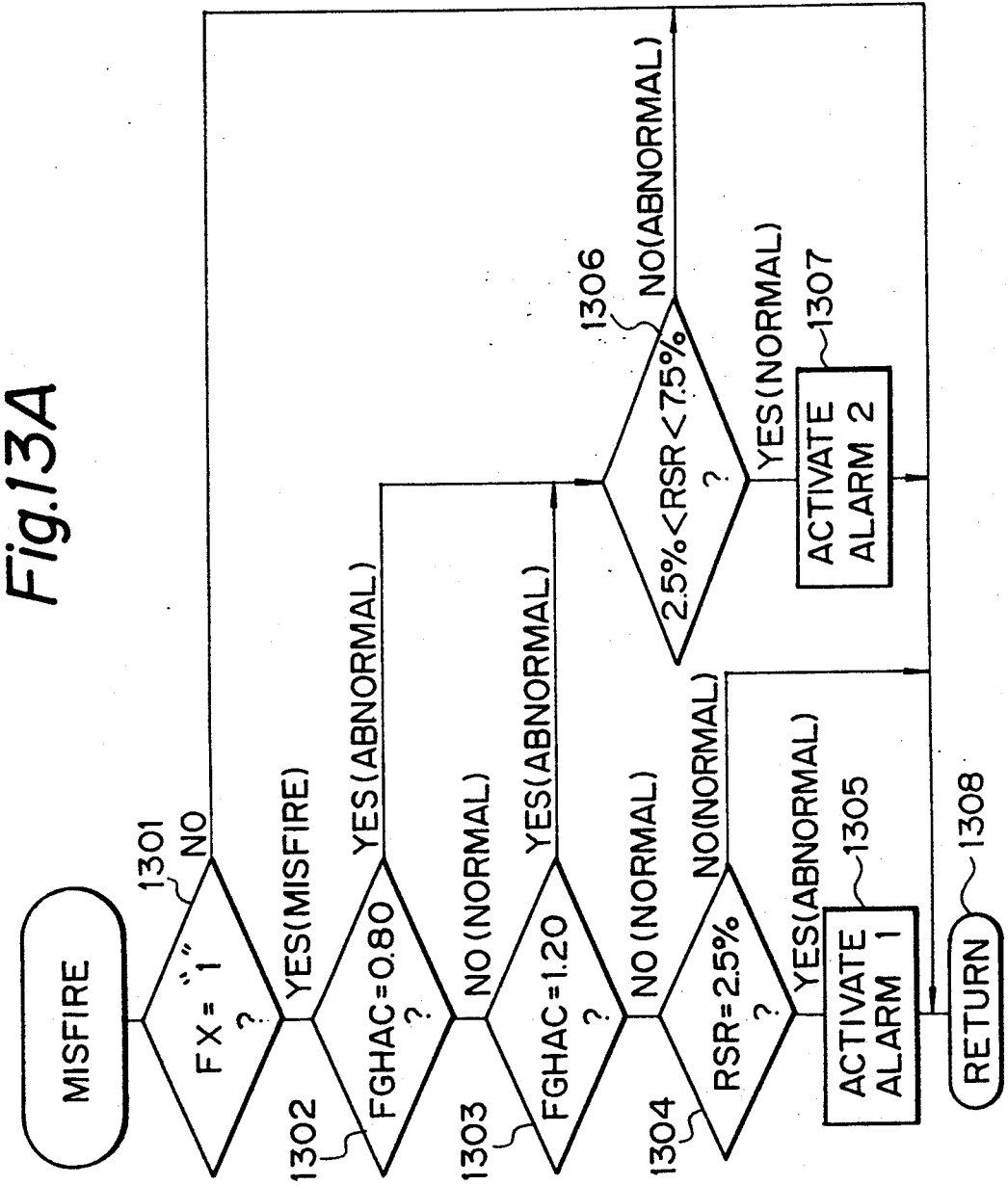
Figure 13B:
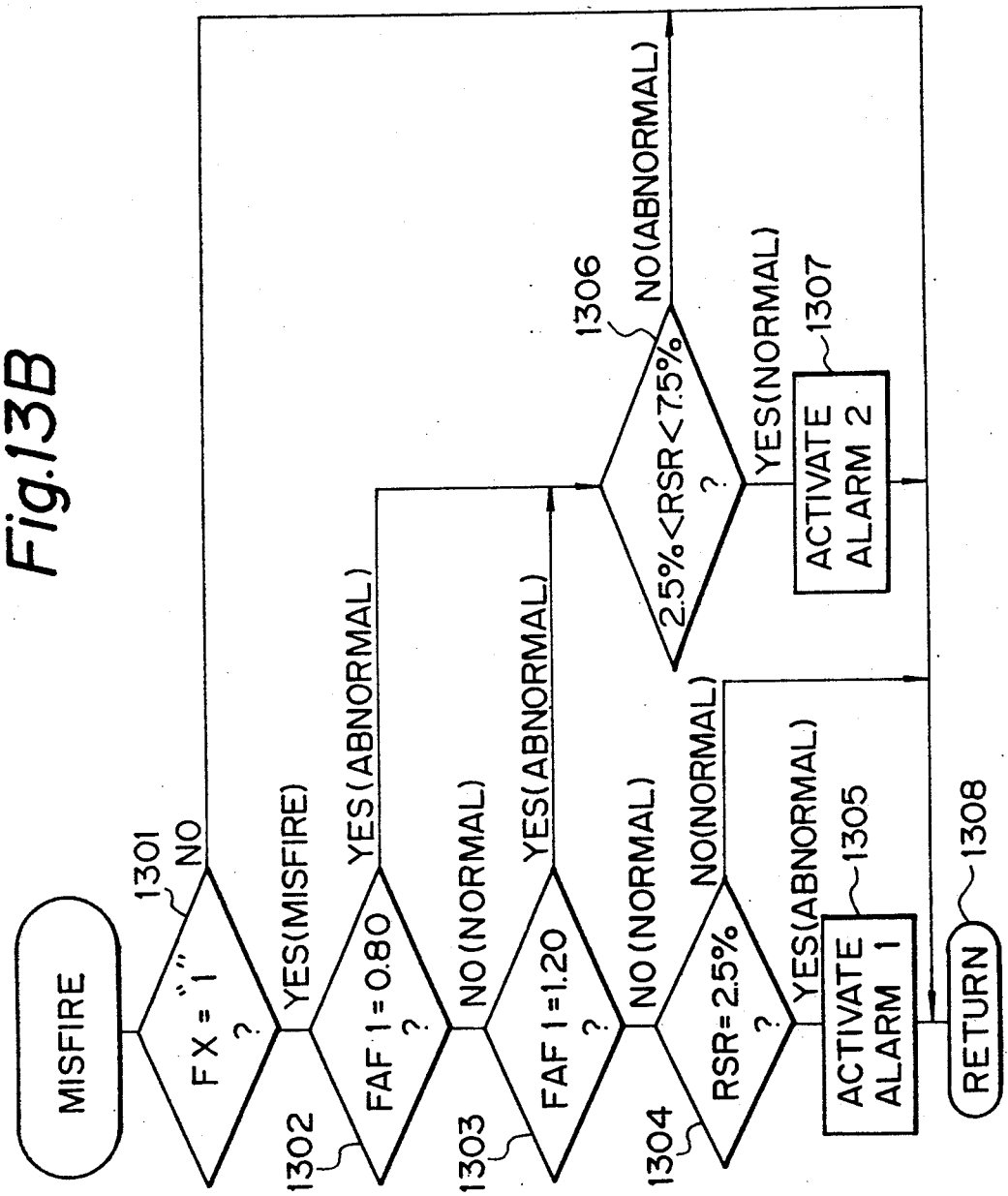

The case of FIGS. 8 and 9, wherein an air-fuel ratio feedback control parameter such as the skip amount RSR is variable, is applied to FIGS. 13A and 13B, which correspond to FIGS. 12A and 12B, respectively.

In FIG. 13A, at step 1301, it is determined whether or not a misfiring state has been established (FX="1"). As a result, only in a misfiring state does the control proceed to steps 1302 through 1307, which determine the origin of the misfire. Otherwise, the control proceeds directly to step 1308.

At step 1302 and 1303, it is determined whether the learning correction amount FGHAC is normal or abnormal.

As a result, if the amount FGHAC is normal, the control proceeds to steps 1304 and 1305, which determine whether the misfire originated from the ignition system. Conversely, if the FGHAC is abnormal, the control proceeds to steps 1306 and 1307 which determine whether or not the misfire originated from the fuel system.

At step 1304, it is determined whether or not the rich skip amount RSR has reached the lean limit value 2.5%. As a result, only if RSR=2.5% does the control proceed to step 1305, which activates the misfiring alarm 19 to notify the driver that the misfire originated from the ignition system.

On the other hand, at step 1306, it is determined whether or not the rich skip amount RSR is normal, i.e., 2.5% < RSR < 7.5%.

As a result, only if 25% < RSR < 7.5% does the control proceed to step 1307, which activates the misfiring alarm 20 to notify the driver that the misfire originated from the fuel system.

Note that above-mentioned activation for the alarm 19 or 20 is also stored in the backup RAM 106 for the diagnosis.

Then, this routine of FIG. 13A is completed by step 1308.

In FIG. 13B, steps 1302' and 1303' are provided instead of steps 1302 and 1303 of FIG. 13A. At step 1302', it is determined whether or not the air-fuel ratio correction amount FAF1 has reached the lean limit value 0.80. Also, at step 1303', it is determined whether or not the air-fuel ratio correction amount FAF1 has reached the rich limit value 1.20.

Note that, when the second air-fuel ratio correction amount FAF2 satisfies 0.80 < FAF2 ≦ 1.20 at step 1204 of FIG. 12A or 12B, or FAF2+0.80 or 1.20 at step 1206 of FIG. 12A or 12B, or when the rich skip amount RSR satisfies 2.5% < RSR < 7.5% at step 1304 of FIG. 13A or 13B, or RSR=2.5% or 7.5% at step 1306 of FIG. 13A or 13B, it is impossible to determine the origin of the misfire. But, in this case, a counter measure can be taken by reading the misfire flag FX from the backup RAM 106.

Thus, according to the routines of FIGS. 12A, 12B, 13A, and 13B, when a misfire due to the abnormality of the ignition system occurs, unburned gas and residual air are expelled from a misfiring cylinder so that the upstream O2 sensor 13 is affected by the above-mentioned residual air to generate a lean output, and accordingly, the air-fuel ratio correction amount FAF1 or the learning correction amount FGHAC is increased. In this case, the amount FAF1 or FGHAC can not reach the rich limit value 1.20, but the downstream O2 sensor 15 is affected by the richer air-fuel ratio, and accordingly, the downstream O2 sensor 15 generates a rich output, so that the air-fuel ratio correction amount FAF2 or the rich skip amount RSR is decreased. As a result, the deviation of the controlled air-fuel ratio from the stoichiometric air-fuel ratio becomes small, but when this misfiring state continues, the air-fuel ratio correction amount FAF2 or the rich skip amount RSR finally reaches the lean limit value. Thus, the control proceeds via steps 1202 (1202'), 1203 (1203'), and 1204 (or 1302 (1302'), 1303 (1303'), and 1304) to step 1205 (or 1305).

On the other hand, when one fuel injection valve injects an excess fuel amount into the corresponding cylinder, the upstream O2 sensor 13 generates a rich output. As a result, the air-fuel ratio correction amount FAF1 or the learning correction amount FGHAC is reduced, and accordingly, the air-fuel ratio correction amount FAF1 or the learning correction amount FGHAC remains at the lean limit value 0.80. Conversely, in this case, the air-fuel ratio downstream of the catalyst converter is not deviated, and accordingly, the second air-fuel ratio correction amount FAF2 or the rich skip amount RSR is normal. Thus, the control proceeds via steps 1202 (1202') or 1302 (1302') to step 1207 (1307).

Also, when one fuel injection valve injects an insufficient fuel amount into the corresponding cylinder, the catalyst operation of the upstream O2 sensor 13 generates a lean output. As a result, the air-fuel ratio correction amount FAF1 or the learning correction amount FGHAC is increased, and accordingly, the air-fuel ratio correction amount (FAF1 or the learning correction amount) FGHAC sticks to the rich limit value 1.20. Conversely, in this case, the air-fuel ratio downstream of the catalyst converter is not deviated from the stoichiometric air-fuel ratio. Therefore, the second air-fuel ratio correction amount FAF2 or the rich skip amount RSR is normal. Thus, the control proceeds via steps 1203 (1203') or 1303 (1303') and 1206 or 1306 to step 1207 or 1307.

Note that the first air-fuel ratio feedback control by the upstream O2 sensor 13 is carried out at a predetermined relatively short interval, such as 4 ms, and the second air-fuel ratio feedback control by the downstream O2 sensor 15 is carried out at a predetermined relatively long interval, such as 1 s. That is because the upstream O2 sensor 13 has good response characteristics compared with the downstream O2 sensor 15.

Further, the present invention can be applied to a double O2 sensor system in which other air-fuel ratio feedback control parameters, such as the integration amounts KIR and KIL, the delay times TDR and TDL, or the reference voltage $V_{R1}$, are variable.

Still further, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can be also applied to a carburetor type internal combustion engine is which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 701 of FIG. 7 or at step 901 of FIG. 9 is determined by the carburetor itself, i.e., the intake air negative pressure and the engine speed, and the air amount corresponding to TAU is calculated at step 702 of FIG. 7 or at step 902 of FIG. 9.

Further, a CO sensor, a lean-mixture sensor or the like can be also used instead of the O2 sensor. Particularly, when a TiO2 sensor is used as the upstream O2 sensor, the control response can be improved, thus avoiding overcorrection by the downstream O2 sensor.

As explained above, according to the present invention, a misfire due to an abnormality of an ignition system can be quickly and accurately detected, which contributes to a better diagnosis, and avoids a deterioration of the catalyst converter.

What is claimed is:

1. A method of controlling an air-fuel ratio in an internal combustion engine having a catalyst converter for removing pollutants in the exhaust gas thereof, and upstream and downstream air-fuel ratio sensors disposed upstream and downstream, respectively, of said catalyst converter, for detecting a concentration of a specific component in the exhaust gas, comprising the steps of:

decreasing a main air-fuel ratio correction amount when the output of said upstream air-fuel ratio sensor is on the rich side;

increasing said main air-fuel ratio correction amount when the output or said upstream air-fuel ratio sensor is on the lean side;

decreasing a sub air-fuel ratio correction amount when the output of said downstream air-fuel ratio sensor is on the rich side;

increasing said sub air-fuel ratio correction amount when the output of said downstream air-fuel ratio sensor is on the lean side;

adjusting an actual air-fuel ratio in accordance with said main and sub air-fuel ratio correction amounts;

determining whether or not said sub air-fuel ratio correction amount has reached a lean limit value; and determining that an ignition system of said engine is abnormal and a misfire may occur when said sub air-fuel ratio correction amount reaches said lean limit value.

2. A method as set forth in claim 1, wherein said sub air-fuel ratio correction amount is an air-fuel ratio feedback control parameter by which said main air fuel ratio correction is calculated.

3. A method as set forth in claim 2, wherein said air fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

4. A method as set forth in claim 2, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

5. A method as set forth in claim 2, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

6. A method as set forth in claim 2, wherein said main air-fuel ratio feedback control parameter is determined by a reference voltage with which the output of said upstream air-fuel ratio sensor is compared, thereby determining whether the air-fuel ratio is on the rich side or on the lean side.

7. A method of controlling an air-fuel ratio in an internal combustion engine having a catalyst converter for removing pollutants in the exhaust gas thereof, and upstream and downstream air-fuel ratio sensors disposed upstream and downstream, respectively, of said catalyst converter, for detecting a concentration of a specific component in the exhaust gas, comprising the steps of:

decreasing a main air-fuel ratio correction amount when the output of said upstream air-fuel ratio sensor is on the rich side;

increasing said main air-fuel ratio correction amount when the output of said upstream air-fuel ratio sensor is on the lean side;

decreasing a sub air-fuel ratio correction amount when the output of said downstream air-fuel ratio sensor is on the rich side;

increasing said sub air-fuel ratio correction amount when the output of said downstream air-fuel ratio sensor is on the lean side;

adjusting an actual air-fuel ratio in accordance with said main and sub air-fuel ratio correction amounts;

determining whether or not said engine is in a misfiring state;

determining whether or not said main air-fuel ratio correction amount is within a first predetermined range when said engine is in a misfiring state;

determining whether or not said sub air-fuel ratio correction amount is within a second predetermined range when said engine is in a misfiring state;

determining that an ignition system of said engine is abnormal and a misfire may occur when said main air-fuel ratio correction amount is within said first predetermined range and said sub air-fuel ratio correction amount reaches a lean limit value of said second predetermined range; and determining that a fuel system of said engine is abnormal and a misfire may occur when said main air-fuel ratio correction amount reaches a rich limit value or a lean limit value of said first predetermined range and said sub air-fuel ratio correction amount is within said second predetermined range.

8. A method as set forth in claim 7, wherein said misfiring determining step comprises the steps of:

determining whether or not said engine is in a deceleration state; and determining whether or not a reduction in speed of said engine is larger than a predetermined amount when said engine is not in a deceleration state, thereby determining that said engine is in a misfiring state when the reduction in speed of said engine is larger than said predetermined amount.

9. A method as set forth in claim 7, wherein said sub air-fuel ratio correction amount is an air-fuel ratio feedback control parameter by which said main air-fuel ratio correction is calculated.

10. A method as set forth in claim 9, wherein said air-fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

11. A method as set forth in claim 9, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

12. A method as set forth in claim 9, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

13. A method as set forth in claim 9, wherein said main air-fuel ratio feedback control parameter is determined by a reference voltage with which the output of said upstream air-fuel ratio sensor is compared, thereby determining whether the air-fuel ratio is on the rich side or on the lean side.

14. A method of controlling an air-fuel ratio in an internal combustion engine having a catalyst converter for removing pollutants in the exhaust gas thereof, and upstream and downstream air-fuel ratio sensors disposed upstream and downstream, respectively, of said catalyst converter, for detecting a concentration of a specific component in the exhaust gas, comprising the steps of:
- decreasing a main air-fuel ratio correction amount when the output of said upstream air-fuel ratio sensor is on the rich side;
- increasing said main air-fuel ratio correction amount when the output of said upstream air-fuel ratio sensor is on the lean side;
- calculating a learning correction amount so that a mean value of said main air-fuel ratio correction amount is brought close to a predetermined value;
- decreasing a sub air-fuel ratio correction amount when the output of said downstream air-fuel ratio sensor is on the rich side;
- increasing said sub air-fuel ratio correction amount when the output of said downstream air-fuel ratio sensor is on the lean side;
- adjusting an actual air-fuel ratio in accordance with said main air-fuel ratio correction amount; said learning correction amount, and said sub air-fuel ratio correction amount;
- determining whether or not said engine is in a misfiring state;
- determining whether or not said learning correction amount is within a first predetermined range when said engine is in a misfiring state;
- determining whether or not said sub air-fuel ratio correction amount is within a second predetermined range when said engine is in a misfiring state;
- determining that an ignition system of said engine is abnormal and a misfire may occur when said learning correction amount is within said first predetermined range and said sub air-fuel ratio correction amount reaches a lean limit value of said second predetermined range; and
- determining that a fuel system of said engine is abnormal and a misfire may occur when said learning correction amount reaches a rich limit value or a lean limit value of said first predetermined range and said sub air-fuel ratio correction amount is within said second predetermined range.

15. A method as set forth in claim 14, wherein said misfiring determining step comprises the steps of:
- determining whether or not said engine is in a deceleration state; and
- determining whether or not a reduction in speed of said engine is larger than a predetermined amount when said engine is not in a deceleration state, thereby determining that said engine is in a misfiring state when the reduction in speed of said engine is larger than said predetermined amount.

16. A method as set forth in claim 14, wherein said sub air-fuel ratio correction amount is an air-fuel ratio feedback control parameter by which said main air-fuel ratio correction is calculated.

17. A method as set forth in claim 16, wherein said air-fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

18. A method as set forth in claim 16, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

19. A method as set forth in claim 16, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

20. A method as set forth in claim 16, wherein said main air-fuel ratio feedback control parameter is determined by a reference voltage with which the output of said upstream air-fuel ratio sensor is compared, thereby determining whether the air-fuel ratio is on the rich side or on the lean side.

21. An apparatus for controlling an air-fuel ratio in an internal combustion engine having a catalyst converter for removing pollutants in the exhaust gas thereof, and upstream and downstream air-fuel ratio sensors disposed upstream and downstream respectively, of said catalyst converter, for detecting a concentration of a specific component in the exhaust gas, comprising:
- means for decreasing a main air-fuel ratio correction amount when the output of said upstream air fuel ratio sensor is on the rich side;
- means for increasing said main air-fuel ratio correction amount when the output of said upstream air-fuel ratio sensor is on the lean side;
- means for decreasing a sub air-fuel ratio correction amount when the output of said downstream air-fuel ratio sensor is on the rich side;
- means for increasing said sub air-fuel ratio correction amount when the output of said downstream air-fuel ratio sensor is on the lean side;
- means for adjusting an actual air-fuel ratio in accordance with said main and sub air-fuel ratio correction amounts;
- means for determining whether or not said sub air-fuel ratio correction amount reaches a lean limit value; and
- means for determining that an ignition system of said engine is abnormal and a misfire may occur when said sub air-fuel ratio correction amount reaches said lean limit value.

22. An apparatus as set forth in claim 21, wherein said sub air-fuel ratio correction amount is an air-fuel ratio feedback control parameter by which said main air-fuel ratio correction is calculated.

23. An apparatus as set forth in claim 22, wherein said air-fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

24. A method as set forth in claim 22, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

25. A method as set forth in claim 22, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

26. A method as set forth in claim 22, wherein said main air-fuel ratio feedback control parameter is determined by a reference voltage with which the output of said upstream air-fuel ratio sensor is compared, thereby determining whether the air-fuel ratio is on the rich side or on the lean side.

27. An apparatus for controlling an air-fuel ratio in an internal combustion engine having a catalyst converter for removing pollutants in the exhaust gas thereof, and upstream and downstream air-fuel ratio sensors disposed upstream and downstream, respectively, of said catalyst converter, for detecting a concentration of a specific component in the exhaust gas, comprising:
means for decreasing a main air-fuel ratio correction amount when the output of said upstream air-fuel ratio sensor is on the rich side;
means for increasing said main air-fuel ratio correction amount when the output of said upstream air-fuel ratio sensor is on the lean side;
means for decreasing a sub air-fuel ratio correction amount when the output of said downstream air-fuel ratio sensor is on the rich side;
means for increasing said sub air-fuel ratio correction amount when the output of said downstream air-fuel ratio sensor is on the lean side;
means for adjusting an actual air-fuel ratio in accordance with said main and sub air-fuel ratio correction amounts;
means for determining whether or not said engine is in a misfiring state;
means for determining whether or not said main air-fuel ratio correction amount is within a first predetermined range when said engine is in a misfiring state;
means for determining whether or not said sub air-fuel ratio correction amount is within a second predetermined range when said engine is in a misfiring state;
means for determining that an ignition system of said engine is abnormal and a misfire may occur when said main air-fuel ratio correction amount is within said first predetermined range and said sub air-fuel ratio correction amount reaches a lean limit value of said second predetermined range; and
means for determining that a fuel system of said engine is abnormal and a misfire may occur when said main air-fuel ratio correction amount reaches a rich limit value or a lean limit value of said first predetermined range and said sub air-fuel ratio correction amount is within said second predetermined range.

28. An apparatus as set forth in claim 27, wherein said misfiring determining means comprises:
means for determining whether or not said engine is in a deceleration state; and
means for determining whether or not a reduction in speed of said engine is larger than a predetermined amount when said engine is not in a deceleration state, thereby determining that said engine is in a misfiring state when the reduction in speed of said engine is larger than said predetermined amount.

29. An apparatus as set forth in claim 27, wherein said sub air-fuel ratio correction amount is an air-fuel ratio feedback control parameter by which said main air-fuel ratio correction is calculated.

30. An apparatus as set forth in claim 29, wherein said air-fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

31. An apparatus as set forth in claim 29, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

32. An apparatus as set forth in claim 29, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

33. An apparatus as set forth in claim 29, wherein said main air-fuel ratio feedback control parameter is determined by a reference voltage with which the output of said upstream air-fuel ratio sensor is compared, thereby determining whether the air-fuel ratio is on the rich side or on the lean side.

34. An apparatus for controlling an air-fuel ratio in an internal combustion engine having a catalyst converter for removing pollutants in the exhaust gas thereof, and upstream and downstream air-fuel ratio sensors disposed upstream and downstream, respectively, of said catalyst converter, for detecting a concentration of a specific component in the exhaust gas, comprising:
means for decreasing a main air-fuel ratio correction amount when the output of said upstream air-fuel ratio sensor is on the rich side;
means for increasing said main air-fuel ratio correction amount when the output of said upstream air-fuel ratio sensor is on the lean side;

means for calculating a learning correction amount so that a mean value of said main air-fuel ratio correction amount is brought close to a predetermined value;

means for decreasing a sub air-fuel ratio correction amount when the output of said downstream air-fuel ratio sensor is on the rich side;

means for increasing said sub air-fuel ratio correction amount when the output of said downstream air-fuel ratio sensor is on the lean side;

means for adjusting an actual air-fuel ratio in accordance with said main air-fuel ratio correction amount, said learning correction amount, and said sub air-fuel ratio correction amount;

means for determining whether or not said engine is in a misfiring state;

means for determining whether or not said learning correction amount is within a first predetermined range when said engine is in a misfiring state;

means for determining whether or not said sub air-fuel ratio correction amount is within a second predetermined range when said engine is in a misfiring state;

means for determining that an ignition system of said engine is abnormal and a misfire may occur when said learning correction amount is within said first predetermined range and said sub air-fuel ratio correction amount reaches a lean limit value of said second predetermined range; and means for determining that a fuel system of said engine is abnormal and a misfire may occur when said learning correction amount reaches a rich limit value or a lean limit value of said first predetermined range and said sub air-fuel ratio correction amount is within said second predetermined range.

35. An apparatus as set forth in claim 34, wherein said misfiring determining means comprises:

means for determining whether or not said engine is in a deceleration state; and means for determining whether or not a reduction in speed of said engine is larger than a predetermined amount when said engine is not in a deceleration state, thereby determining that said engine is in a misfiring state when the reduction in speed of said engine is larger than said predetermined amount.

36. An apparatus as set forth in claim 34, wherein said sub air-fuel ratio correction amount is an air-fuel ratio feedback control parameter by which said main air-fuel ratio correction is calculated.

37. An apparatus as set forth in claim 36, wherein said air-fuel ratio feedback control parameter is defined by a lean skip amount by which said main air-fuel ratio correction amount is skipped down when the output of said upstream air-fuel ratio sensor is switched from the lean side to the rich side and a rich skip amount by which said main air-fuel ratio correction amount is skipped up when the output of said upstream air-fuel ratio sensor is switched from the rich side to the lean side.

38. An apparatus as set forth in claim 36, wherein said air-fuel ratio feedback control parameter is defined by a lean integration amount by which said main air-fuel ratio correction amount is gradually decreased when the output of said upstream air-fuel ratio sensor is on the rich side and a rich integration amount by which said main air-fuel ratio correction amount is gradually increased when the output of said upstream air-fuel ratio sensor is on the lean side.

39. An apparatus as set forth in claim 36, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

40. An apparatus as set forth in claim 36, wherein said main air-fuel ratio feedback control parameter is determined by a reference voltage with which the output of said upstream air-fuel ratio sensor is compared, thereby determining whether the air-fuel ratio is on the rich side or on the lean side.

* * * * *